(12) United States Patent
Nelson et al.

(10) Patent No.: US 8,336,596 B2
(45) Date of Patent: Dec. 25, 2012

(54) COMPOSITE LAMINATION USING ARRAY OF PARALLEL MATERIAL DISPENSING HEADS

(75) Inventors: Paul E. Nelson, University Place, WA (US); Robert Alan Kramp, Jr., Bonney Lake, WA (US); Matthew K. Lum, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 1474 days.

(21) Appl. No.: 11/366,156

(22) Filed: Mar. 2, 2006

(65) Prior Publication Data

US 2006/0162143 A1 Jul. 27, 2006

Related U.S. Application Data

(60) Continuation-in-part of application No. 11/245,307, filed on Oct. 6, 2005, which is a division of application No. 10/301,949, filed on Nov. 22, 2002, now Pat. No. 7,137,182, application No. 11/366,156, which is a continuation-in-part of application No. 10/301,949.

(51) Int. Cl.
| | |
|---|---|
| *B65B 51/06* | (2006.01) |
| *B29C 65/00* | (2006.01) |
| *B32B 37/00* | (2006.01) |
| *B32B 38/04* | (2006.01) |
| *B32B 38/10* | (2006.01) |
| *B44C 7/00* | (2006.01) |
| *E04D 15/00* | (2006.01) |

(52) U.S. Cl. .................. 156/574; 156/486; 156/523
(58) Field of Classification Search ............ 156/60, 156/166, 169, 172, 173, 174, 184, 185, 187, 156/188, 189, 190, 196, 212, 213, 215, 349, 156/443, 475, 486, 510, 523, 538, 574, 277; 29/592, 428, 429, 430, 431
See application file for complete search history.

(56) References Cited

U.S. PATENT DOCUMENTS 3,574,040 A 4/1971 Chitwood et al. ............ 156/522
(Continued)

FOREIGN PATENT DOCUMENTS

DE 30 40 838 5/1982
(Continued)

OTHER PUBLICATIONS

U.S. Appl. No. 10/628,691, entitled Systems and Methods for Identifying Foreign Objects and Debris (FOD) and Defects During Fabrication of a Composite Structure, filed Jul. 28, 2003, Engelbart, et al.

(Continued)

*Primary Examiner* — Michael Tolin
*Assistant Examiner* — Brian R Slawski
(74) *Attorney, Agent, or Firm* — Harness, Dickey & Pierce, P.L.C.

(57) ABSTRACT

Aspects of the present disclosure include various exemplary embodiments of systems and methods relating to composite lamination using one or more arrays of parallel material dispensing heads. In one embodiment, a method of fabricating a high aspect ratio composite article generally includes applying a first strip material to a work surface datum at a first angle with a first material dispenser, and applying a plurality of second strip materials to a work surface datum each at a second angle with a plurality of rotatable parallel material dispensers. The method also includes advancing the first material dispenser and the rotatable parallel material dispensers as a unit the width of the second strip material and continuing application of the first strip material by the first material dispenser and a plurality of second strip materials by the rotatable parallel material dispensers until a desired length is reached.

21 Claims, 19 Drawing Sheets

U.S. PATENT DOCUMENTS

| | | | | |
|---|---|---|---|---|
| 3,587,378 | A | 6/1971 | Oppenheim et al. | 83/801 |
| 3,879,245 | A | 4/1975 | Fetherston et al. | |
| 4,064,534 | A | 12/1977 | Chen et al. | |
| 4,208,238 | A | 6/1980 | August et al. | 156/510 |
| 4,285,752 | A | 8/1981 | Higgins | 156/250 |
| 4,292,108 | A | 9/1981 | Weiss et al. | 156/259 |
| 4,310,132 | A | 1/1982 | Robinson et al. | |
| 4,461,669 | A | 7/1984 | Dontscheff | 156/574 |
| 4,491,493 | A | 1/1985 | Eaton | |
| 4,508,584 | A | 4/1985 | Charles | |
| 4,531,992 | A | 7/1985 | Eaton | |
| 4,548,859 | A | 10/1985 | Kline et al. | |
| 4,591,402 | A | 5/1986 | Evans et al. | 156/350 |
| 4,608,220 | A | 8/1986 | Caldwell et al. | |
| 4,693,678 | A | 9/1987 | Von Volkli | |
| 4,699,683 | A | 10/1987 | McCowin | |
| 4,707,212 | A | 11/1987 | Hailey et al. | 156/361 |
| 4,760,444 | A | 7/1988 | Nielson et al. | |
| 4,780,262 | A | 10/1988 | Von Volkli | |
| 4,790,898 | A | 12/1988 | Woods | |
| 4,830,298 | A | 5/1989 | Van Blunk | |
| 4,867,834 | A | 9/1989 | Alenskis et al. | |
| 4,877,471 | A | 10/1989 | McCowin et al. | |
| 4,941,182 | A | 7/1990 | Patel | |
| 4,995,937 | A | 2/1991 | Persson | 156/543 |
| 4,997,510 | A * | 3/1991 | Shinno et al. | 156/361 |
| 5,022,952 | A | 6/1991 | Vaniglia | 156/441 |
| 5,024,399 | A | 6/1991 | Barquet et al. | |
| 5,058,497 | A | 10/1991 | Bishop et al. | |
| 5,337,647 | A | 8/1994 | Roberts et al. | |
| 5,397,523 | A * | 3/1995 | Curry | 264/136 |
| 5,439,549 | A | 8/1995 | Frye et al. | |
| 5,450,147 | A | 9/1995 | Dorsey-Palmateer | |
| 5,518,208 | A | 5/1996 | Roseburg | |
| 5,540,126 | A | 7/1996 | Piramoon | |
| 5,562,788 | A | 10/1996 | Kitson et al. | |
| 5,645,677 | A | 7/1997 | Cahuzac et al. | 156/361 |
| 5,651,600 | A | 7/1997 | Dorsey-Palmateer | |
| 5,683,646 | A | 11/1997 | Reiling, Jr. | |
| 5,700,337 | A | 12/1997 | Jacobs et al. | |
| 5,746,553 | A | 5/1998 | Engwall | |
| 5,804,276 | A | 9/1998 | Jacobs et al. | |
| 5,814,386 | A | 9/1998 | Vasiliev et al. | |
| 5,825,495 | A | 10/1998 | Huber | |
| 5,871,117 | A | 2/1999 | Protasov et al. | |
| 5,917,588 | A | 6/1999 | Addiego | |
| 5,954,917 | A | 9/1999 | Jackson et al. | |
| 5,963,660 | A | 10/1999 | Koontz et al. | |
| 5,979,531 | A | 11/1999 | Barr et al. | |
| 6,012,883 | A | 1/2000 | Engwall et al. | |
| 6,013,341 | A | 1/2000 | Medvedev et al. | |
| 6,045,651 | A | 4/2000 | Kline et al. | |
| 6,074,716 | A | 6/2000 | Tsotsis | |
| 6,086,696 | A | 7/2000 | Gallagher | |
| 6,112,792 | A | 9/2000 | Barr et al. | |
| 6,168,358 | B1 | 1/2001 | Engwall et al. | |
| 6,180,196 | B1 | 1/2001 | Glover et al. | 428/34 |
| 6,205,239 | B1 | 3/2001 | Lin et al. | |
| 6,364,250 | B1 | 4/2002 | Brinck et al. | |
| 6,369,492 | B1 | 4/2002 | Sugimoto | |
| 6,390,169 | B1 | 5/2002 | Johnson | |
| 6,451,152 | B1 | 9/2002 | Holmes et al. | |
| 6,480,271 | B1 | 11/2002 | Cloud et al. | |
| 6,547,769 | B2 | 4/2003 | Van Tassel et al. | |
| 6,639,662 | B2 | 10/2003 | Vaez-Iravani et al. | |
| 6,648,273 | B2 | 11/2003 | Anast | |
| 6,692,681 | B1 | 2/2004 | Lunde | |
| 6,725,123 | B1 | 4/2004 | Denuell | |
| 6,792,621 | B2 | 9/2004 | Braun | |
| 6,799,619 | B2 | 10/2004 | Engelbart et al. | |
| 6,814,822 | B2 | 11/2004 | Engelbart et al. | |
| 6,871,684 | B2 | 3/2005 | Engelbart et al. | |
| 7,039,485 | B2 | 5/2006 | Engelbart et al. | |
| 7,048,024 | B2 | 5/2006 | New | |
| 7,080,441 | B2 | 7/2006 | Braun | |
| 7,083,698 | B2 | 8/2006 | Engwall | |
| 7,134,629 | B2 | 11/2006 | Johnson et al. | |
| 7,159,822 | B2 | 1/2007 | Grantham et al. | |
| 7,193,696 | B2 | 3/2007 | Engelbart et al. | |
| 7,228,611 | B2 | 6/2007 | Anderson et al. | |
| 7,236,625 | B2 | 6/2007 | Engelbart et al. | |
| 7,278,198 | B2 | 10/2007 | Olson et al. | |
| 7,282,107 | B2 | 10/2007 | Johnson | |
| 7,289,656 | B2 | 10/2007 | Engelbart et al. | |
| 7,325,771 | B2 | 2/2008 | Stulc | |
| 7,326,312 | B1 * | 2/2008 | Rust et al. | 156/234 |
| 7,527,222 | B2 | 5/2009 | Biornstad et al. | |
| 7,624,488 | B2 | 12/2009 | Lum | |
| 2002/0141632 | A1 | 10/2002 | Engelbart et al. | |
| 2004/0098852 | A1 * | 5/2004 | Nelson | 29/428 |
| 2005/0023414 | A1 | 2/2005 | Braun | |
| 2005/0025350 | A1 | 2/2005 | Engelbart et al. | |
| 2005/0039842 | A1 * | 2/2005 | Clark et al. | 156/173 |
| 2005/0039843 | A1 * | 2/2005 | Johnson et al. | 156/175 |
| 2005/0039844 | A1 | 2/2005 | Engwall | |
| 2005/0102814 | A1 | 5/2005 | Johnson | |
| 2005/0117793 | A1 | 6/2005 | Engelbart et al. | |
| 2005/0203657 | A1 | 9/2005 | Engelbart et al. | |

FOREIGN PATENT DOCUMENTS

| | | |
|---|---|---|
| DE | 33 31 494 | 3/1985 |
| EP | 0 319 797 | 6/1989 |
| EP | 0 833 146 | 4/1998 |
| EP | 1 03 0 172 | 8/2000 |
| JP | 2001012930 | 1/2001 |
| WO | WO 94/18643 | 8/1994 |

OTHER PUBLICATIONS

U.S. Appl. No. 10/819,084, filed Apr. 6, 2004, Turnmire et al.
U.S. Appl. No. 10/853,075, filed May 25, 2004, Johnson et al.
U.S. Appl. No. 10/949,848, filed Sep. 23, 2004, Stulc.
U.S. Appl. No. 60/559,890, filed Apr. 6, 2004, Biornstad et al.
U.S. Appl. No. 60/559,911, filed Apr. 6, 2004, Johnson et al.
U.S. Appl. No. 10/851,381, filed May 20, 2004, Biornstad et al.
Patent Abstracts of Japan, vol. 2000, No. 16, May 8, 2001, Japan.
Fiedler, L., et al, "Tango Composite Fuselage Platform", SAMPE Journal, vol. 39, No. 1, Jan./Feb. 2003, pp. 57-63.
BAe 146, Flight International, May 2, 1981, 2 pages.
A Barrelful of Experience, Intervia, May 1992, 2 pages.
Raytheon, Mar. 2000, vol. 4, No. 2, http://www.cts.com/king/vasci/newsletter/vol42.html.
Business Avaiation, Jun. 7, 2002, http:www.aviationnow.com/avnow/news/channel_busav.jsp?view=story&id=news/btoyo06.
Beechcraft's Composite Challenge, http://www.aerotalk.com/Beech.cfm, Apr. 13, 2003.
Evans, Don O., "Fiber Placement," 3 pages, Cincinnati Mchine, pp. 477-479, 2001.
Advanced Technology Tape Laying for Affordable Manufacturing of Large Composite Structures; http://www.cinmach.com/tech/pdf/TapeLayingGrimshaw.pdf; Michael N. Grimshaw, et al; 11 pages, May 2001.
Fiber Placement; http://www.cinmach.com/tech/pdf/asm_chapter_fp.pdf; Don O. Evans; Cincinnati Machine; 3 pages, 2001.
Automated Tape Laying; http://www.cinmach.com/tech/pdf/Grimshaw%20ASM%20Handbook.pdf; Michael N. Grimshaw; Cincinnati Machine; 6 pages, 2001.
Raytheon Aircraft's Hawker Horizon Reaches Fuselage Milestone, Raytheon News Release; http://www.beechcraft.de/Presse/2000/100900b.htm 2 pages, 2002.
Prof. J. Zhang: "Angewandte Sensorik" CH. 4, Sensoren in Der Robotik, Nov. 11, 2003, pp. 76-113, XP002327793; URL:http://tech-www.informatik.uni-hamburg.de/lehre/ws2003/vorlesungen/angewandte_sensorik/vorlesung_03.pdf>, retrieved on Apr. 2004, p. 89.
CPC-610, Automatic Composite Tape Laying System, 1 page.
European Search Report, Application No. EP 03 07 8499, Dated Mar. 4, 2004, 5 pages.
Sharp et al.; "Material Selection/Fabrication Issues for Thermoplastic Fiber Placement", Journal of Thermoplastic Composite Materials, vol. 8; Jan. 1995, p. 2-14.
http://www.cinmach.com/WolfTracks4_1/MTG_WT7.htm; Premier I Features Lighter, Stronger All-Composite Fuselage, 3 pages, 1998.

http://www.cinmach.com/compnews/PressReleases/pr00-11.htm; Raytheon Aircraft Orders Four More Fiber Cincinnati Fiber Placement Systems for Industry's First Composite-Fuselage Business Jets, 2 pages, Jul. 20, 2000.

http://www.rockymountaincomposites.com/wind_sys.htm; Filament Winding, 2 pages, 2005.

* cited by examiner

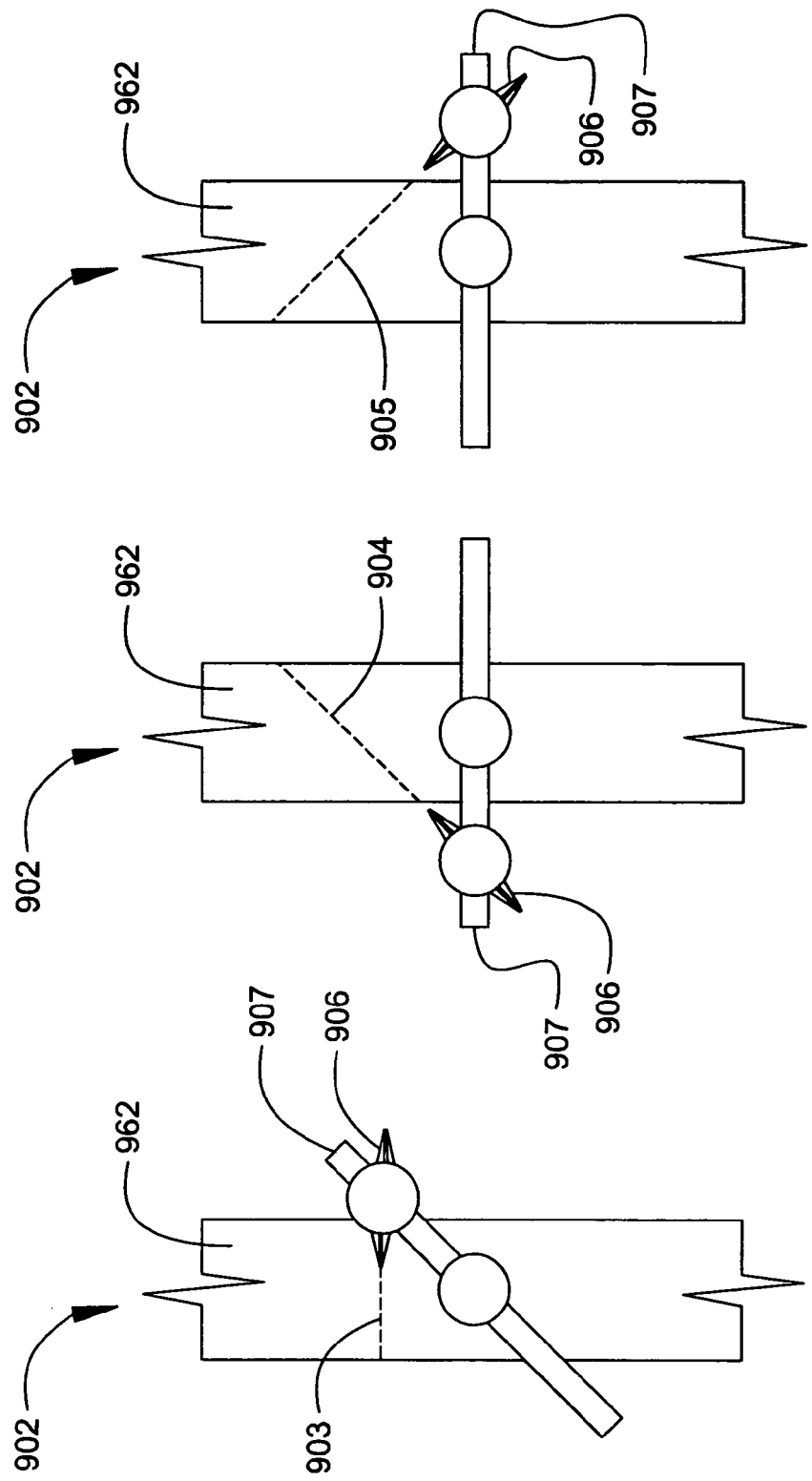

COMPOSITE LAMINATION USING ARRAY OF PARALLEL MATERIAL DISPENSING HEADS

CROSS-REFERENCE TO RELATED APPLICATIONS

This application is a continuation-in-part of U.S. patent application Ser. No. 11/245,307 filed Oct. 6, 2005, which, in turn, is a divisional of U.S. patent application Ser. No. 10/301, 949 filed Nov. 22, 2002 now U.S. Pat. No. 7,137,182. This application is a continuation-in-part of U.S. patent application Ser. No. 10/301,949 filed Nov. 22, 2002 which issued Nov. 21, 2006 as U.S. Pat. No. 7,137,182. The disclosures of the above applications are incorporated herein by reference.

FIELD

The present disclosure generally relates to composite lamination using an array of parallel material dispensing heads.

BACKGROUND

The statements in this section merely provide background information related to the present disclosure and may not constitute prior art.

Articles that are formed partially or wholly from composite materials (herein after referred to as "composite articles") are employed in a vast number of fields, usually to provide the finished article with desired characteristics, such as a relatively low weight and a relatively high strength. One method of fabricating composite articles includes the use of strips of a composite material, such as a graphite tape or cloth, to form what is known in the art as a composite "lay-up". The lay-up includes one or more layers, with each layer being formed from touching and/or overlapping strips of the material. A resin, which may be pre-impregnated in the material or later injected into one or more of the layers of material, is later processed to cure the lay-up such that the material strips are bonded together. Typically, the lay-up is formed on a mandrel having a formed work surface that conforms to the desired geometry of the finished composite article. Since the lay-up is relatively flexible and unable to support itself prior to curing, the mandrel is usually employed to support the lay-up during the curing process.

Known methods for the fabrication of composite articles include manual and automated fabrication. Manual fabrication entails manual cutting and placement of material by a technician to a surface of the mandrel. This method of fabrication is time consuming and cost intensive, and could possibly result in non-uniformity in the lay-up.

Known automated fabrication techniques include flat tape laminating machines (FTLM) and contour tape laminating machines (CTLM). Typically, both the FTLM and the CTLM employ a solitary composite material dispenser that travels over the work surface onto which the composite material is to be applied. The composite material is typically laid down a single row (of composite material) at a time to create a layer of a desired width and length. Additional layers may thereafter be built up onto a prior layer to provide the lay-up with a desired thickness. FTLM's typically apply composite material to a flat transfer sheet or scrim. The transfer sheet and lay-up are subsequently removed from the FTLM and placed onto a mold or on a mandrel. In contrast, CTLM's typically apply composite material directly to the work surface of a mandrel.

The specifications for many composite articles further require that the composite material of each layer be applied in a predetermined orientation, with the orientations of each layer being different. To vary the orientation of the composite material in the layers, typically either the tape dispenser is moved at different angles relative to the mandrel or transfer sheet, or the mandrel or transfer sheet is manually shifted relative to the tape dispenser. The batch processing employed in known automated tape laminating devices can be slow, tedious, and cumbersome. Therefore, there is a need for an automated process that expedites the fabrication of and increases the quality of composite lay-ups.

A wide variety of structures can be fabricated from laminated tape using CTLM, FTLM, or manually. One such example is laminated tape aircraft structures, many of which are prepared with CTLM, FTLM, or manually laminated tape. Because many existing CTLM and FTLM have a single tape dispensing head and a relatively low throughput (e.g., typically three to five pounds per hour per machine), however, these machines can be a bottleneck during aircraft product, especially for large commercial aircraft which can have thousands of pounds of composite structures.

SUMMARY

According to various aspects of the present disclosure, there are provided various exemplary embodiments of systems and methods relating to composite lamination using one or more arrays of parallel material dispensing heads. One particular exemplary embodiment includes a method of fabricating a high aspect ratio composite article. In this embodiment, the method generally includes applying a first strip material to a work surface datum at a first angle with a first material dispenser and applying a plurality of second strip materials to a work surface datum each at a second angle with a plurality of rotatable parallel material dispensers. The method also includes advancing the first material dispenser and the rotatable parallel material dispensers as a unit the width of the second strip material and continuing application of the first strip material by the first material dispenser and a plurality of second strip materials by the rotatable parallel material dispensers until a desired length is reached.

Another exemplary embodiment of the present disclosure includes a device for fabricating a high aspect ratio composite article. In this embodiment, the device generally includes a plurality of material dispensers movable relative to a structure having a work surface datum. Each material dispenser is operable for applying strip material to the work surface datum along a predetermined axis. The plurality of material dispensers includes at least a first material dispenser, at least a second material dispenser in-line with the first material dispenser, and a plurality of material dispensers substantially parallel with each other. The parallel material dispensers are disposed generally between and at an angle to the first and second in-line material dispensers. The first and second in-line material dispensers are translatable relative to the work surface datum such that the first and second in-line material dispensers can apply strip material to the work surface datum along a predetermined axis, in one direction and then the opposite direction. The parallel material dispensers are rotatable about a vertical axis and translatable relative to the work surface datum such that the parallel material dispenses can be rotatably positioned for applying strip material at predetermined axes that are not parallel to strips applied by the first and second in-line material dispensers.

A further exemplary embodiment of the present disclosure includes a method of fabricating a high aspect ratio composite article. In this embodiment, the method generally includes applying a plurality of strip materials to a work surface datum each at an angle with a plurality of parallel material dispensers by selectively cutting predetermined lengths of the strip materials, without cutting backing material, at an angle corresponding with the angle at which the plurality of strip materials will be applied to the work surface datum, positioning the cut predetermined lengths of strip materials for placement to the work surface datum, and applying the cut predetermined lengths of strip materials to the work surface datum without moving the parallel material dispensers as a whole. The method also includes advancing the parallel material dispensers as a unit the width of the strip material and continuing application of a plurality of strip materials by the parallel material dispensers until a desired length is reached.

Further aspects and features of the present disclosure will become apparent from the detailed description provided hereinafter. In addition, any one or more aspects of the present disclosure may be implemented individually or in any combination with any one or more of the other aspects of the present disclosure. It should be understood that the detailed description and specific examples, while indicating exemplary embodiments of the present disclosure, are intended for purposes of illustration only and are not intended to limit the scope of the present disclosure.

DRAWINGS

The drawings described herein are for illustration purposes only and are not intended to limit the scope of the present disclosure in any way.

FIGS. 15A through 15C are schematic illustrations of an exemplary kiss cutting device capable of cutting strip material at different angles according to an exemplary embodiment of the present disclosure;

DETAILED DESCRIPTION

The following description is merely exemplary in nature and is in no way intended to limit the present disclosure, application, or uses.

According to various aspects of the present disclosure, there are provided composite lamination devices having an array or stack of modular material dispensing heads configured to operate parallel to one another. Such composite lamination devices may include material dispensers specifically arranged and tailored for producing composite articles within particular part families. For example, one exemplary embodiment includes material dispensing heads configured for producing high aspect ratio composite articles, such as stringers, narrow spars, floor beams, etc. Another exemplary embodiment includes material dispensing heads configured for producing relatively large parts and parts with low aspect ratios, such as ribs, wheel bulkheads, empennage panels, and other large parts. Yet another exemplary embodiment includes material dispensing heads configured for producing wide-to-narrow spars, very long and wide parts (e.g., wing panels, spars, etc.) and drape-able skins.

In addition, various embodiments can provide a modular configuration for the material dispensing heads, which, in turn, can lead to improved productivity by enabling depleted or failed material dispensing heads to be quickly replaced. In various embodiments, the multiple simultaneous laminations and ability for the material dispensing heads to be cleaned and replenished offline can improve machine productivity (and in some case) by as much as an order of magnitude higher than many existing CTLM and FTLM systems. Some embodiments can also include plus or minus forty-five degree cutting capability.

In various embodiments (examples of which are shown in FIGS. 10 through 16 and described below), a material lamination device is provided that is well-suited for producing wing stringers, floor beams, narrow spars, and other high aspect ratio parts. In these particular embodiments, an array or stack of material dispensing heads is deployed along a table's length (X-axis). The stack of heads can collectively swivel as a group, for example, to a positive forty-five degree echelon (e.g., FIG. 10), a ninety degree echelon (e.g., FIG. 11), a negative forty five degree echelon (e.g., FIG. 12), among other angular settings.

Non-swiveling heads can also be used to dispense zero degree strip material or plies. Accordingly, various aspects of the present disclosure can provide improved tape laying machines and methods well-suited for fabricating long narrow composite components, such as wing stringers and spars, floor beams, among other high aspect ratio composite articles.

Figure 1:
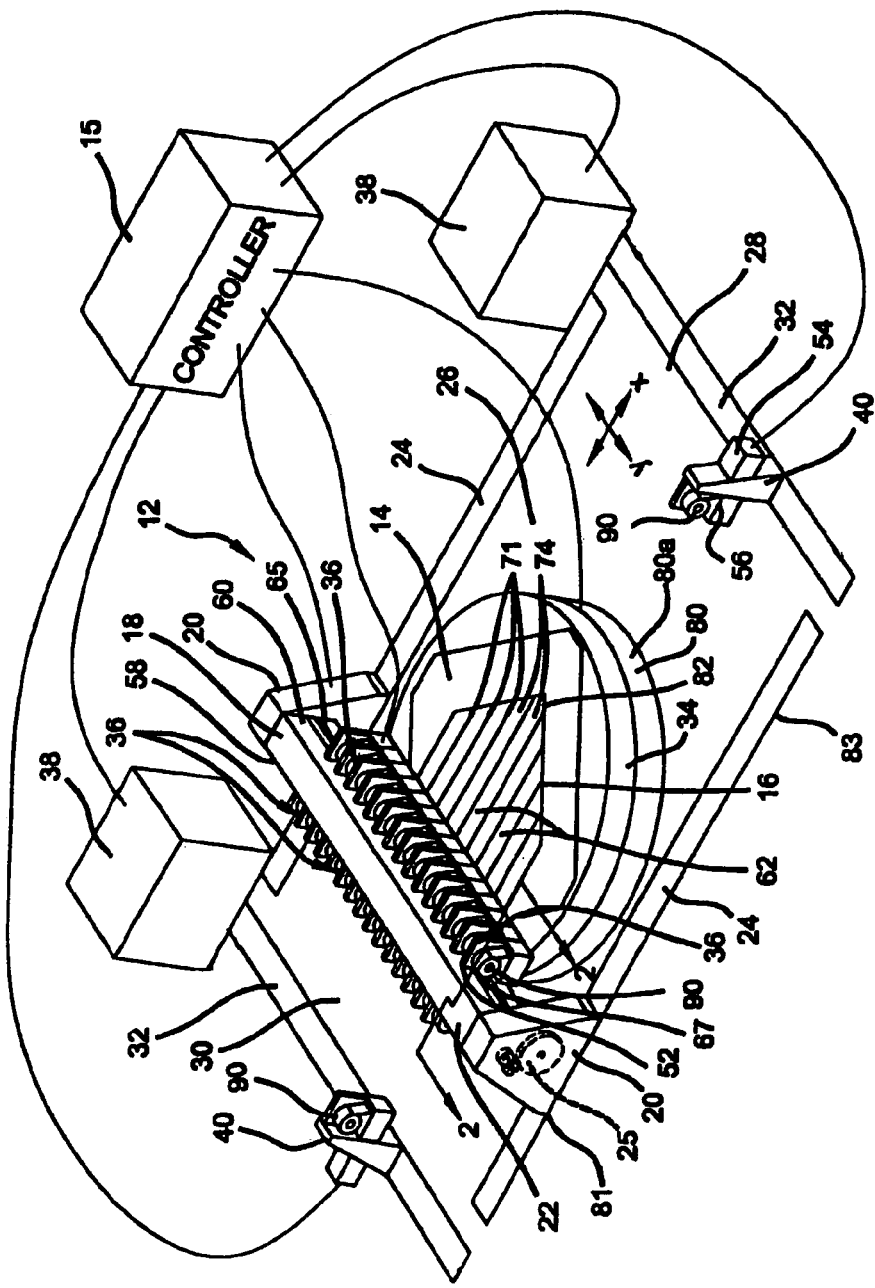
FIG. 1 is a perspective view of a composite fabrication device constructed in accordance with an exemplary embodiment of the present disclosure.

Various other embodiments include a gantry with non-rotatable material dispensing heads disposed above a rotary turntable, which is used for supporting and rotating the work piece relative to the material dispensing heads. An example of one such embodiment is shown in FIG. 1 and described herein. These exemplary embodiments can be useful for producing large parts such a ribs, bulkheads, empennage panels, and other large parts.

Figure 16A:
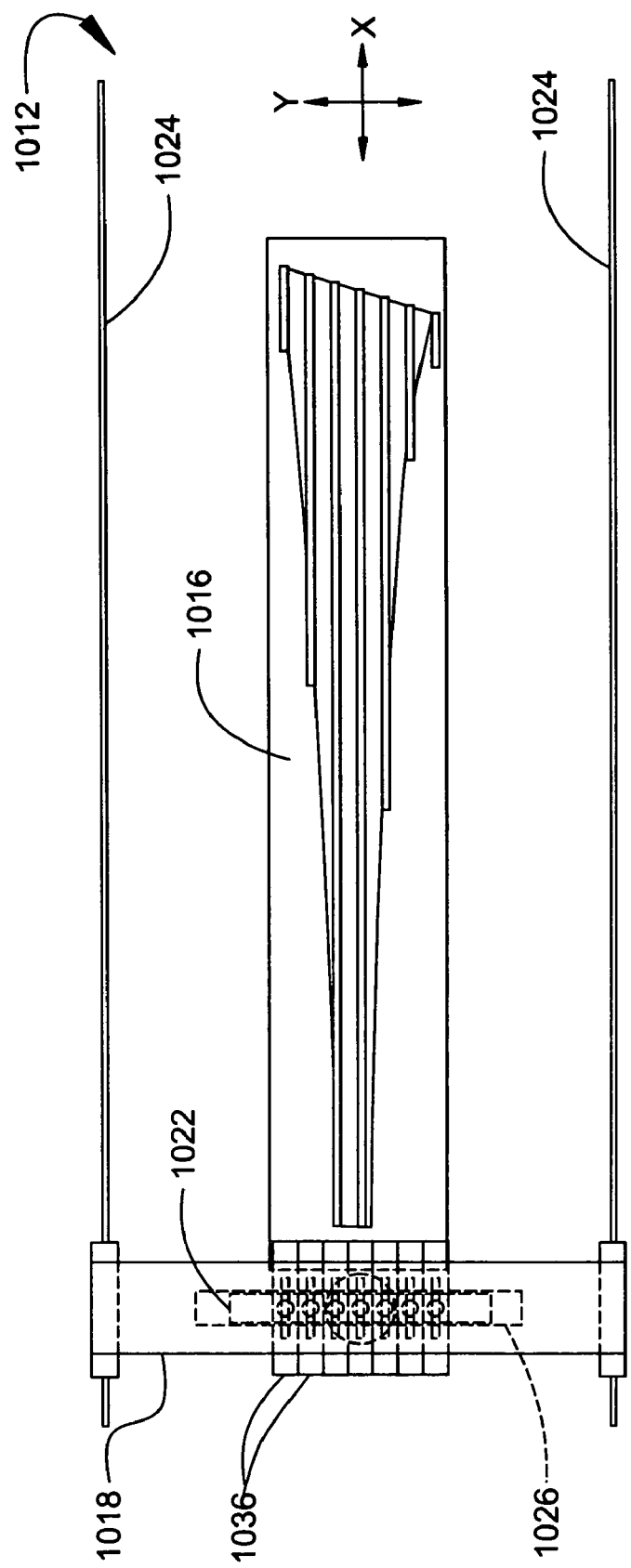
FIG. 16A is an overhead view of another exemplary gantry and material dispenser configuration according to an exemplary embodiment of the present disclosure.
Figure 16B:
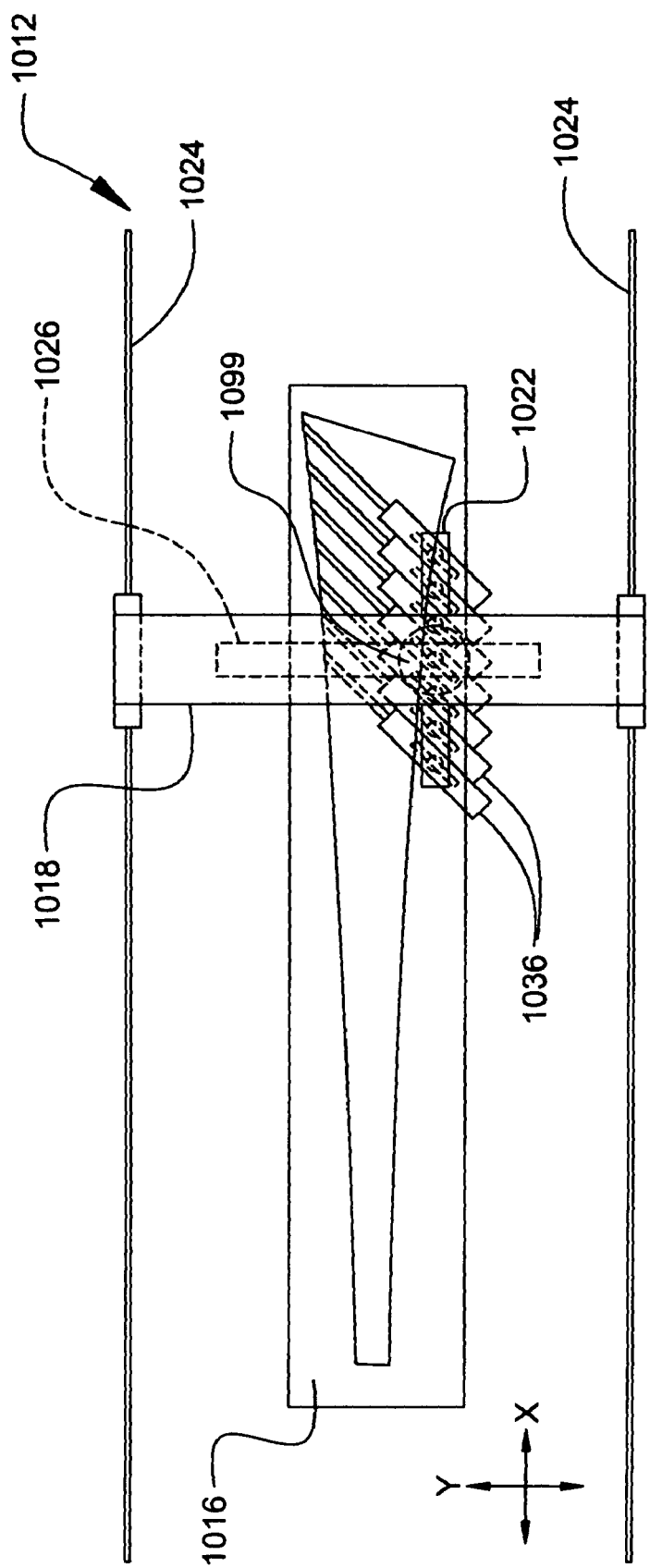
FIG. 16B is an overhead view of the gantry and material dispenser configuration shown in FIG. 16A after the array of material dispensing heads have been swiveled or rotated.

Additional embodiments include an array or stack of material dispensing heads generally positioned in a rank and carried on an X-Y gantry. In some of these embodiments, the array of heads may be rotatable between a positive forty-five degree and a negative forty-five degree echelon. An example of one such embodiment is shown in FIGS. 16A and 16B and described herein. These exemplary embodiments can be useful for producing very long and wide parts, such as wing panels and spars, among others.

Figure 8:
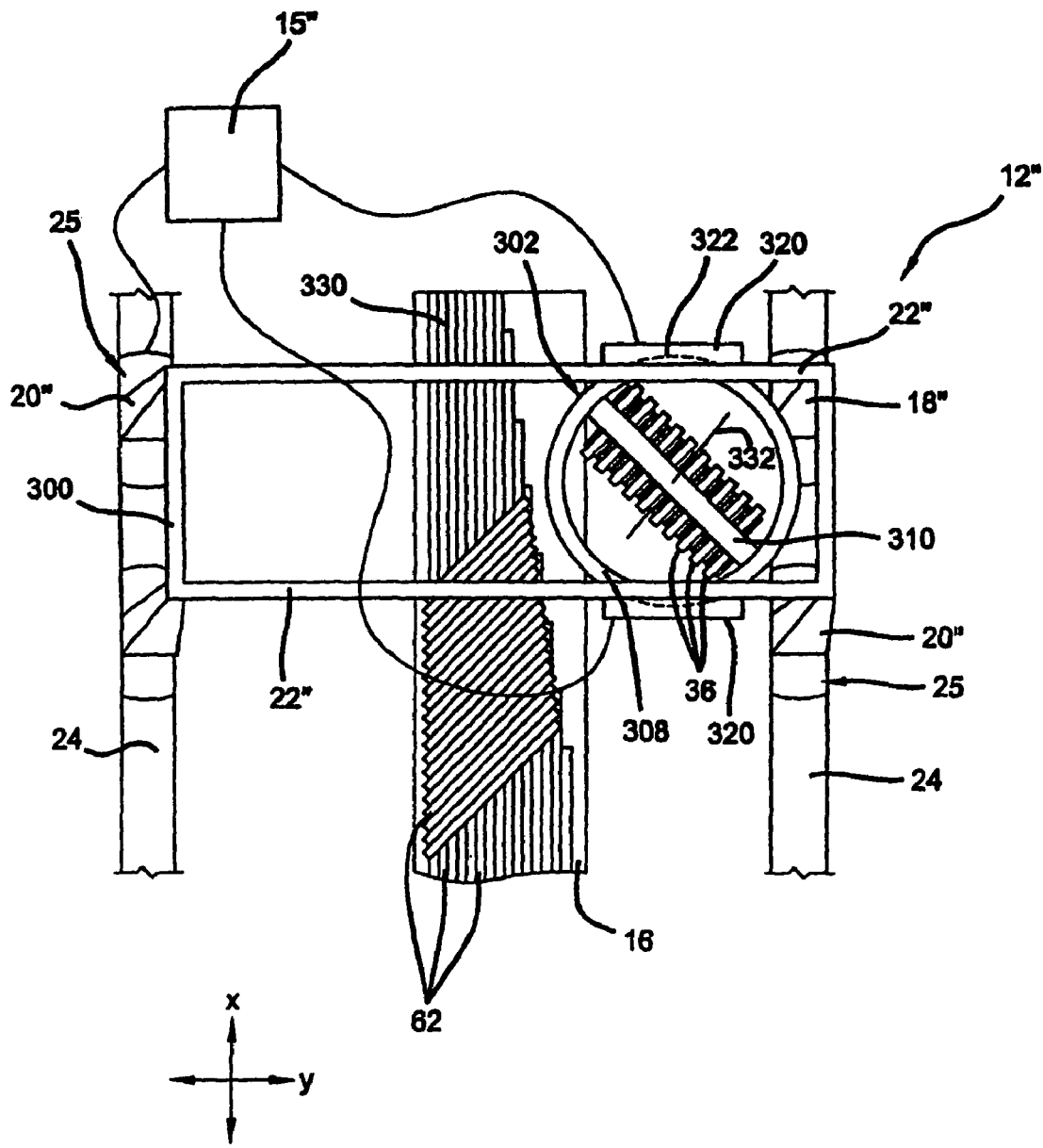
FIG. 8 is a partial overhead view of another exemplary embodiment of a gantry and material dispenser configuration in accordance with the present disclosure.

Further embodiments include an array or stack of material dispensing heads carried on a rotary unit, which, in turn, is suspended from an X-Y gantry. The X-Y gantry is disposed above a fixed table. An example of one such embodiment is shown in FIG. 8 and described herein. These exemplary embodiments can be useful for producing very long and wide parts, such as wing panels and spars, among other long and wide parts where the part size would require the turntable for the entire part to be so large as to be impractical.

FIG. 1 illustrates a composite fabrication device 12 constructed in accordance with one embodiment of the present disclosure. In this particular illustrated embodiment, the composite fabrication device 12 includes a structure 14 having a work surface datum (a work surface) 16. The composite fabrication device 12 has a gantry 18 elevated over the work surface datum 16. In the example provided, the gantry 18 includes two vertical beams 20 and a bridge rail 22. Alternatively, the gantry 18 may be constructed in numerous other ways including a pair of overhead runways or beams (not shown) that support the opposite ends of the bridge rail 22.

The vertical beams 20 are associated with a pair of tracks 24 that bound the opposite sides of a working area 26. For purposes of discussion, the tracks 24 define a X-axis that is generally perpendicular to a Y-axis defined by the bridge rail 22. The vertical beams 20 can move along the tracks 24, thus the tracks 24 may be, for example, rails over which wheels (not shown) attached to the vertical beams 20 travel. The gantry 18 can be selectively propelled along the tracks 24 by a suitable drive mechanism 25, which may be a servo tractor or any drive mechanism known in the art. The bridge rail 22 is attached to the vertical beams 20, either in a fixed position or such that it has vertical mobility with respect to the structure 14 below. In the latter instance, the bridge rail 22 is permitted to move vertically to adjust the position of the bridge rail 22 relative to the structure 14 that is located beneath the gantry 18. Translation of the gantry 18 on the tracks 24 and, if the gantry 18 is equipped as such, vertical movement of the bridge rail 22 may be automatically and/or manually controlled. The composite fabrication device 12 can include a control processing unit, or a controller 15, that interfaces with the drive mechanism 25 and the gantry 18 and its several components. In view of the extent of the disclosure, a detailed discussion of the construction and operation of the controller 15 need not be provided herein as such controllers 15 are well within the capabilities of one skilled in the art.

An anterior end 28 and a posterior end 30 of the working area 26 are bounded by end tracks 32. Within the working area 26, the structure 14 may be placed upon or incorporated into a support base 34. In accordance with an aspect of the present embodiment, the support base 34 is rotatable relative to the bridge rail 22. Such rotation can be achieved by placing the support base 34 on a rotary turntable 80 or incorporating a conventional rotary drive mechanism 80a into the support base 34. Thus, the work surface datum 16 of the structure 14 may have its orientation changed by rotating the rotary turntable 80 in the example provided. Alternatively, the support base 34 may have a fixed position and the gantry 18 may be moved (e.g., rotated) or the movement of the bridge rail 22 rotated and controlled along both the X and Y axes to change the orientation with which material is laid onto the work surface datum 16 as will be discussed in greater detail below.

Figure 2:
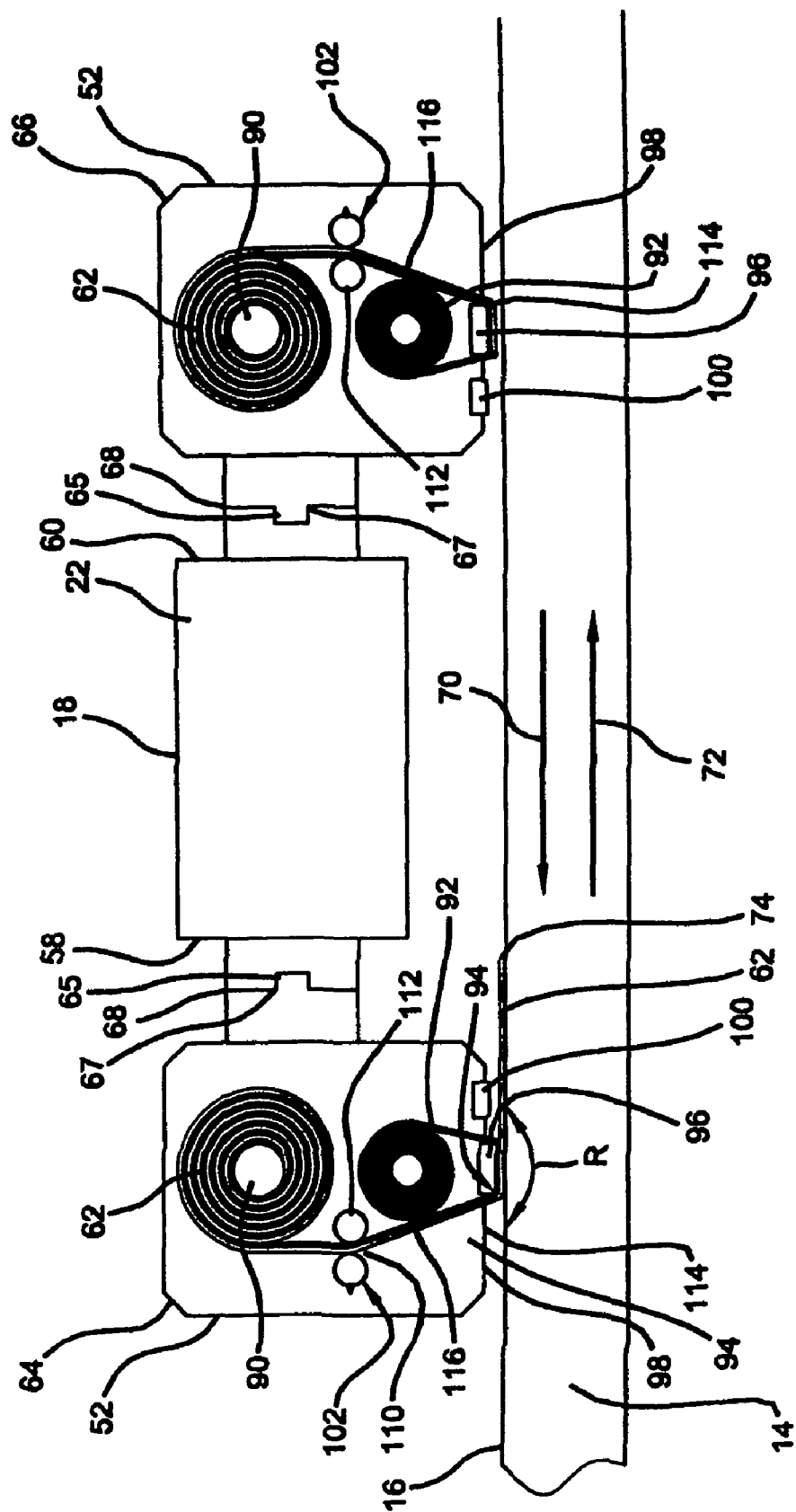
FIG. 2 is a cross-sectional view taken along the line 2-2 of FIG. 1 and illustrates components of an exemplary material dispensing head according to an exemplary embodiment of the present disclosure.

A plurality of material dispensers 36 are attached (directly and/or indirectly) to opposite sides 58 and 60, respectively, of the bridge rail 22. The material dispensers 36 may also be attached to only a single side (58 or 60) of the bridge rail 22, if adjacent material dispensers 36 are oriented to dispense material in opposite directions. The material dispensers 36 apply material strips 62 (such as for example, carbon fiber pre-impregnated resin tapes or cloth, etc.) to the work surface datum 16 of the structure 14. The position of material dispensers 36 along the bridge rail 22 is fixed such that the material dispensers 36 are attached at predetermined positions along the bridge rail 22. In an alternate embodiment, the position of the material dispensers 36 may be adjustable and the position of the material dispensers 36 may be translated relative to one another along the bridge rail 22 to accommodate a variety of differently sized strip materials 62 and material dispenser 36 configurations, as shown in FIGS. 1 and 2. The material dispensers 36 may be translated along the bridge rail 22 by any known method in the art. One exemplary method is to attach the material dispensers 36 to a track 65 along the bridge rail 22. Locking mechanisms 67 on the material dispensers 36 lock the position of each material dispenser 36 during operation. Release of the locking mechanisms 67 allows movement of the material dispensers 36 to new positions along the bridge rail 22. The bridge rail 22 and track 65 may also permit introduction or removal of material dispensers 36, as necessary.

An exemplary configuration for the present embodiment includes staggered material dispensers 36 on the sides 58, 60 of the bridge rail 22, as shown in the example of FIG. 1. Each material dispenser 36 has a housing 52 containing rolled strip material 62. Since the housing 52 typically is wider than the width of the strip material 62, the staggered configuration allows applied strip materials 62 to abut or only have small gaps (e.g., less than one-half the width of strip material 62, etc.) in between. Thus, a material dispenser 36 on the first side 58 of the gantry 18 is situated with respect to a material dispenser 36 on the second side 60 so as to allow the strip material 62 to be applied in an alternating strip pattern. The amount of distance between edges 71 of strip material 62 is a function of the distance between the material dispensers 36 and is chosen based upon various design criteria for the composite lay-up that is to be fabricated. The position of the edges 71 of the strip material 62 relative to one another may range from a small gap to no overlap (i.e., abutting) to over one-half the width of the strip material 62. The distance between the material dispensers 36 may be adjusted (e.g., via the track 65 and locking mechanisms 67, etc.) to provide the desired degree of overlap. In an alternate embodiment, the material dispensers 36 may be fixed along the bridge rail 22, and the bridge rail 22 may move a short distance along the Y axis (i.e. less than the width of the strip material 62) to thereby enable similar strip material layers to overlap previously applied layers of strip material 62 in the same orientation.

With reference to FIG. 2, material dispensers 36 are illustrated as coupled to the bridge rail 22. For purposes of discussion, a first one 64 of the material dispensers 36 is coupled to the first side 58 of the bridge rail 22, and a second one 66 of the material dispensers 36 is coupled to the second side 60. Each material dispenser 36 operably houses strip material 62 that is rolled onto a spool 90 in the material dispenser housing 52. Such strip material 62 on a spool 90 may optionally be held in a separate cartridge (not shown) contained within the housing 52. The strip material 62 can have a backing paper 92 to inhibit undesirable blocking of the strip material 62 during release. The strip material 62 can be cut prior to approaching a release region 94 wherein the strip material 62 is applied to the work surface datum 16.

Figure 5:
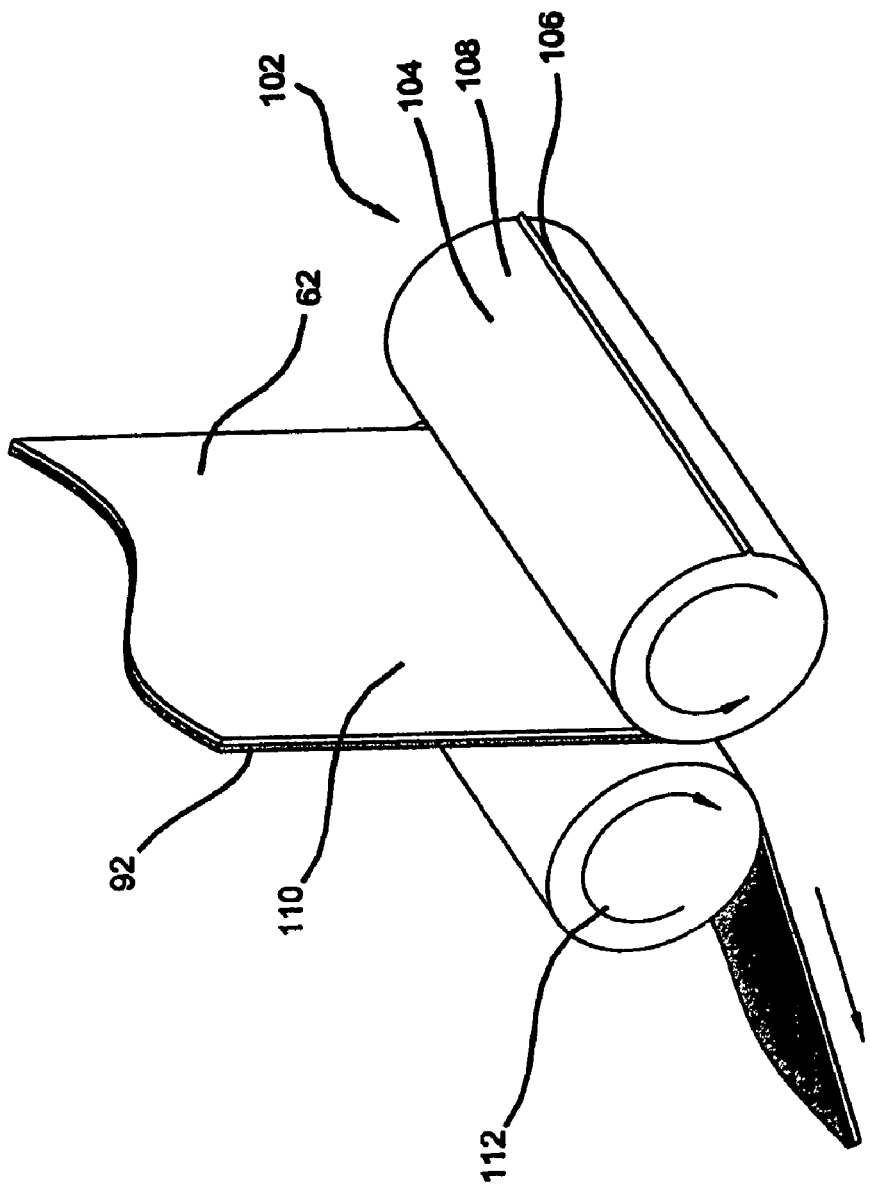
FIG. 5 is a perspective view of a portion of an exemplary material dispenser illustrating the cutter and idler drum.

With continued reference to FIG. 2, the material dispenser 36 also has a cutter 102 for cutting the strip material 62. Such cutters 102 may be for example, blade or laser cutters. One exemplary embodiment of a cutter 102 is shown in FIGS. 2 and 5, where a cutter drum 104 has a surface 108 with a single cutter blade 106 protruding and extending along the entire length of the cutter drum 104. As strip material 62 is applied to the work surface datum 16, the blade 106 faces away from the area 110 where strip material 62 passes. As the strip material 62 is unrolled, it passes over an idler drum 112, which directs it towards a release region 114. The strip material 62 passes between the idler drum 112 on one side and a cutter drum 104 on the other side. The cutter drum 104 sits stationary with the cutter blade 106 facing away from the strip material 62 passing by, that is, unless a cut in the strip material 62 is necessary. Then, the cutter drum 104 is actuated and rolls towards the strip material 62 to cut it. This type of cutter drum 104 enables cutting to be accomplished continuously without interrupting the application of strip material 62. The cutter drum 104 is configured such that the strip material 62 is cut while leaving the backing paper 92 intact. The backing paper 92 continues to be wound onto a collector spool 116. The collector spool 116 may also be optionally contained in a cartridge (not shown) in the housing 52 with the roll 90 of strip material 62. The backing paper 92 draws the strip material 62 into the release region 114 of the material dispenser 36. The backing paper 92 facilitates movement and smooth application of the strip material 62 along the work surface datum 16.

An alternate embodiment of the cutter drum 104 of the present disclosure includes a helical configuration blade (not shown) that enables angled cuts to be made while the cutter drum 104 rotates towards the strip material 62. When the cutter blades 106 for each material dispenser 36 make straight cuts across the strip material 62, the resulting strip material composite lay-up has edges that are serrated or crenulated. Such a composite lay-up can later be trimmed, usually after curing occurs in the lay-up mandrel, to achieve a straight finished edge for the finished composite article. Other exemplary embodiments of cutting apparatus and devices are shown in FIGS. 15 and 16 and described herein.

In the illustrated embodiment of FIG. 2, the strip material 62 and backing paper 92 are compressed or smoothed against the work surface datum 16 by a primary compactor or shoe 96, which is retractable (i.e. capable of descending from a bottom surface 98 of the material dispenser 36 and also capable of at least partially retracting above the bottom surface 98 of the material dispenser 36). Further, the primary compactor 96 optionally has a degree of freedom of rotational movement as designated by arrow R that enables the primary compactor 96 to adapt to angles or contours along the work surface datum 16. This freedom of movement may be necessary when the structure 14 is a contoured lay-up mandrel. The material dispenser 36 optionally has a trailing compactor 100, which may further assist in smoothing the strip material 62 along the work surface datum 16, especially at terminal edges 74 (FIG. 1) of the strip material 62 after it is cut. Both the primary and trailing compactors 96, 100 (FIG. 2) retract when the material dispenser 36 is not in use, and the movements of the primary and trailing compactors 96, 100 can be automated by computerized controls.

Strip materials 62 may include fiber reinforced composites, polymers (e.g. adhesives or laminates), and metal foil, although the present disclosure is not limited to the materials listed above, but rather is adaptable to any strip material. As those skilled in the art will appreciate, material selection for the strip material 62 is dependent on the application in which the composite article will be used, and different strip materials 62 may be applied in alternate layers to provide the composite lay-up with desired characteristics.

Fiber reinforced composite materials are generally categorized as tape, woven cloth, non-woven cloth, paper, and mixtures thereof. "Tape" generally refers to and includes uniaxial reinforcement fibers that extend along a single axis of the strip material. The term "cloth" generally refers to and includes reinforcement fibers laid along at least two different axes within the strip material. Cloth is commercially available as bi-axial, tri-axial and quad-axial, indicating fibers extending in two, three, or four different axes, respectively. The fibers may optionally be woven with one another, or may be manufactured as non-woven cloth. A vast array of composite reinforcement fibers are commercially available, such as for example, carbon, Kevlar® fibers, glass, and mixtures thereof. Metal foils are also known in the art, and may be included in composite articles. Such metal foils are frequently interspersed as material layers within a lay-up composite. Strip materials are commercially available in a wide variety of widths. One common width for fiber reinforced material strips is six inches. Aspects of the present disclosure contemplate and are adaptable to a variety of strip material widths, and material dispensers 36 may be re-positioned along the gantry 18 to accommodate different strip material widths. In addition, the dimensions set forth in this paragraph (as are all dimensions set forth herein) are mere examples and can be varied depending, for example, on the particular application.

The term "composite article" generally refers to and includes a material that includes a composite resin matrix, wherein the resin includes at least one polymer or mixtures of polymers, and fibers or particles that are distributed throughout to form the matrix or composite. Strip material 62 is available in both resin pre-impregnated and non-impregnated configurations. A pre-impregnated resin strip material 62 (generally referred to as "pre-preg") has resin added into the strip prior to spooling it onto rolls. When a non-impregnated strip material 62 (generally referred to as "dry fiber") is employed, a resin is typically added in a subsequent processing step. Non-impregnated strip materials 62 typically employ a tackifier or adhesive (typically a polymer) that facilitates adhesion of the strip material 62 layers to the work surface datum 16 or other previously applied layers of strip material 62. Processing methods that subsequently add the resin into the layers of strip material 62 are well known in the art and include, for example, vacuum assisted resin infusion into the strip material 62.

Returning to FIG. 1, the material dispensers 36 are changed out when the supply of strip material 62 is exhausted or a different layer of strip material 62 is needed for the composite lay-up. In this particular illustrated embodiment, material changers 40 can service the material dispensers 36 to replace an entire material dispenser 36. The material changers 40 may optionally change only material cartridges (not shown) contained within the housing 52 of the material dispensers 36. Thus, it is contemplated that the material changers 40 may optionally change out an entire material dispenser 36 (including a housing 52), or the material changers 40 may change out only a material cartridge of a material dispenser 36 thus leaving the housing 52 and material dispenser 36 attached to the bridge rail 22. The example shown in FIGS. 1 and 2 depicts material changers 40 that replace the entire material dispenser 36. But either configuration of material changer 40 is feasible and contemplated for various embodiments of the present disclosure.

In an exemplary embodiment, one or more mobile modular material changers 40 translate along each end track 32 to service the plurality of material dispensers 36 that are located on an associated side of the bridge rail 22. The end tracks 32 are adjacent to changing stations 38 which service the mobile material changers 40 and provide a repository for used and new material dispensers 36. The mobile modular material changers 40 hold a replacement material dispenser 36 for replenishing or changing the strip material 62 in the material dispensers 36 attached to the gantry 18.

The mobile modular material changer 40 can be automated and interface with the gantry 18 to replace a designated material dispenser 36 when, for example, the material in a given material dispenser 36 has diminished to a predetermined level or a different strip material 62 is to be applied. The gantry 18 is moved to either the anterior end 28 or posterior end 30 so it is next to one of the end tracks 32. The material changer 40 moves laterally along the end track 32 so that it approaches the individual material dispenser 36 requiring service. Such a material dispenser 36 may be selected based on an output signal from the material dispenser 36 itself indicating that the amount of strip material 62 is low or may be automatically or manually selected to change the strip material 62 within the composite lay-up being formed. The material changer 40 has a receiving region 54 to place a spent or used material dispenser 36 into. The material changer 40 also has a replacement region 56 for storing the "new" material dispenser 36 so that it is available for placing into location at which the "old" material dispenser 36 has been removed.

The material changer 40 engages the material dispenser 36, interfaces with the gantry 18 as necessary to release the quick connect 68 which is either interconnected directly with the bridge rail 22 (not shown) or alternately with the track 65 and locking mechanism 67, and removes the material dispenser 36. The material changer 40 places the "old" material dispenser 36 into the receiving region 54, and acquires a "new" material dispenser 36 which it attaches to the bridge rail 22. Alternately, the material replenishing and/or changing operation may be accomplished manually. In such an embodiment, changing stations 38 and end tracks 32 would not be necessary components.

The material dispensers 36 can be attached either directly to the chair rail 22, or attached to the track 65 on the chair rail 22, via a coupling 68, as shown in FIG. 2. One exemplary type of coupling 68 is a quick release connection generally known as a "quick connect", such as a Quick Change 300, which is commercially available from EOA Systems, Inc., located in Carrollton, Tex. Further, if only a cartridge (not shown) is removed from the material dispenser 36, it can be coupled to the housing 52 by a quick connect. As those skilled in the art will appreciate, however, suitable couplings and quick connects are well known in the art and as such, the scope of the present disclosure is not limited to the exemplary coupling discussed and illustrated herein. If the first and second material dispensers 64, 66 are attached to the track 65 that permits movement of the material dispensers 64, 66 along the bridge rail 22, the releasable locking mechanism 67 locks the material dispensers 36 in place.

As shown generally in FIGS. 1 and 2, each of the first and second material dispensers 64, 66 is employed to apply strip material 62 to the work surface datum 16 of the structure 14. A pattern of multiple material strips 62 applied onto the work surface datum 16 by the plurality of material dispensers 36 on the first and second sides 58, 60 of the bridge rail 22 form a layer 82. An out stroke of the bridge rail 22 from the starting point 81 to the ending point 83 enables the material dispensers 36 to apply strip material 62 in a first direction 70, where each material strip 62 is substantially parallel with one another. The return or back stroke that occurs as the bridge rail 22 travels in a reverse direction from the ending point 83 back to the starting point 81 enables strip material 62 to be laid in parallel along a predetermined axis by the second material dispensers, as shown by 72. A single round trip stroke of the gantry 18 creates an entire layer of material 82 composed of material strips 62 all parallel with one another.

The gantry 18 moves across the working area 26 over the structure 14 in a first direction 70 (i.e., an out stroke) and returns in a second direction 72 (i.e., a return stroke) laying strip material 62 along a predetermined axis. Although the gantry 18 may move over the entire working area 26 which spans from the anterior end 28 to posterior end 30, the gantry 18 may alternatively only move over small regions of the working area 26. Thus, during operation when strip material 62 is being applied, the gantry 18 is capable of traveling a shortened distance along the tracks 24. This can be advantageous where a structure 14 and its work surface datum 16 are relatively small in comparison to the overall work area 26, and the gantry 18 may only need to move partially along the tracks 24 from a starting position or point 81 at the front of the structure 14 to an ending position or point 83 at the end of the structure 14. Partial translation of the gantry 18 along the tracks 24 can facilitate faster application of strip material 62 along a pre-determined axis to the work surface datum 16.

Figure 3:
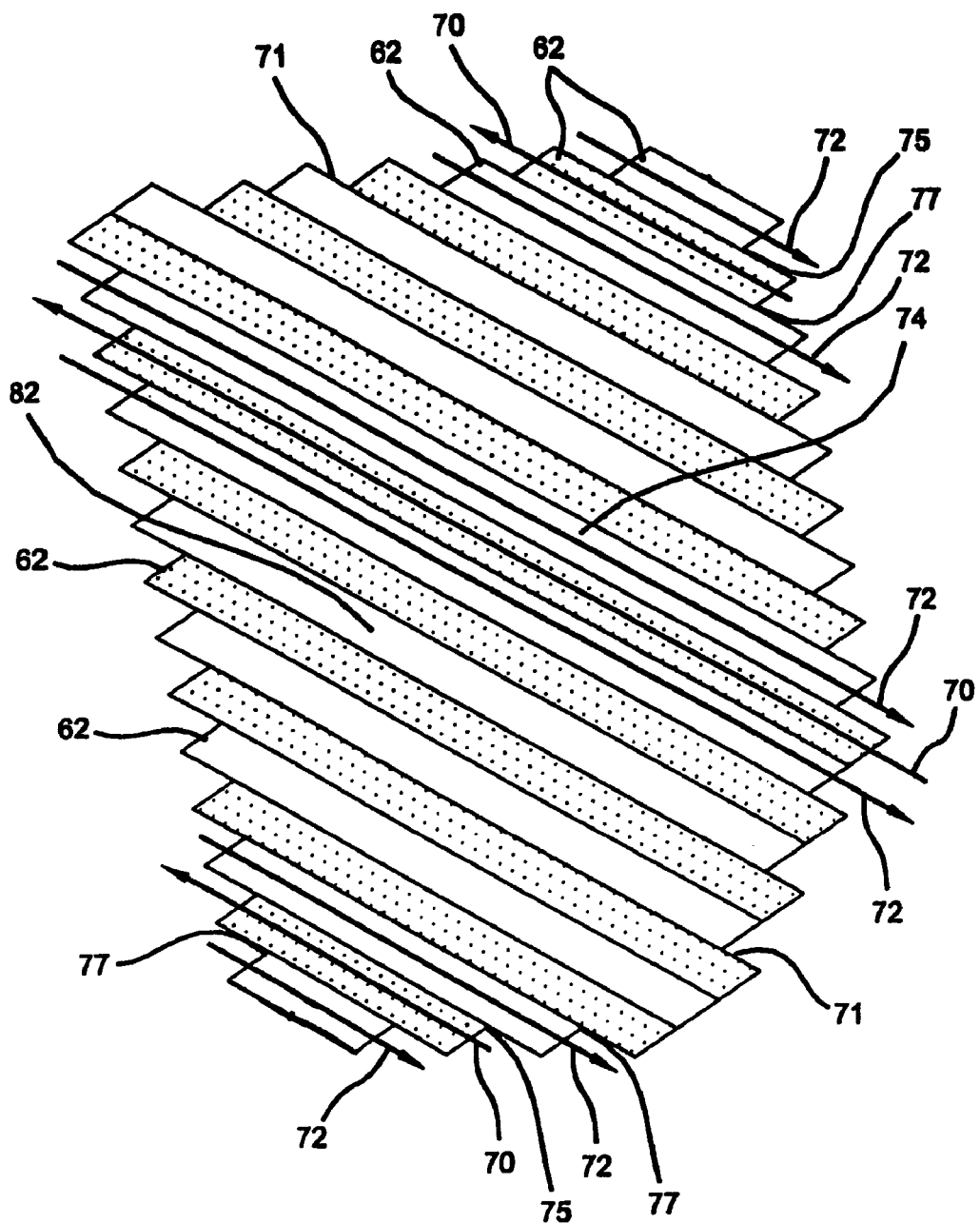
FIG. 3 is a plan view of a layer of strip material applied to a work surface datum in accordance with one exemplary embodiment of the present disclosure.

With reference to FIG. 3, in this particular illustrated configuration, strip material 62 is applied in a first direction 70 (via the first material dispensers 64 in FIG. 2) and a second direction 72 (via the second material dispensers 66 in FIG. 2), wherein the second direction 72 is opposite the first direction 70. Each edge 71 of strip material 62 interfaces with (e.g., comes into close proximity with by either having a small gap or abutting) another edge 71 of another strip material 62 that was applied in the opposite direction. The junction lines 75, 77 indicate where the edges of strip material 62 applied in a first direction 70 approach and/or abut the edges of the strip material 62 applied in a second direction 72.

Figure 4A:
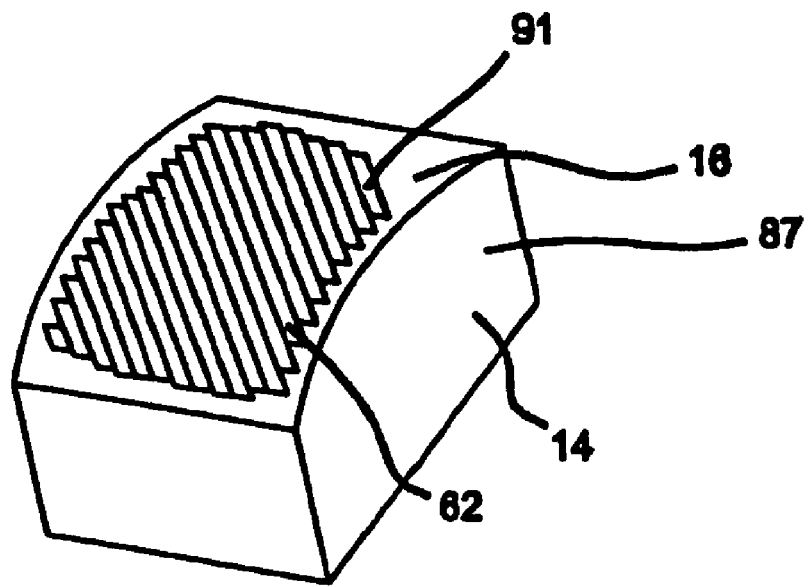
FIG. 4A is a schematic illustration showing the fabrication of an exemplary composite lay-up on a mandrel.
Figure 4B:
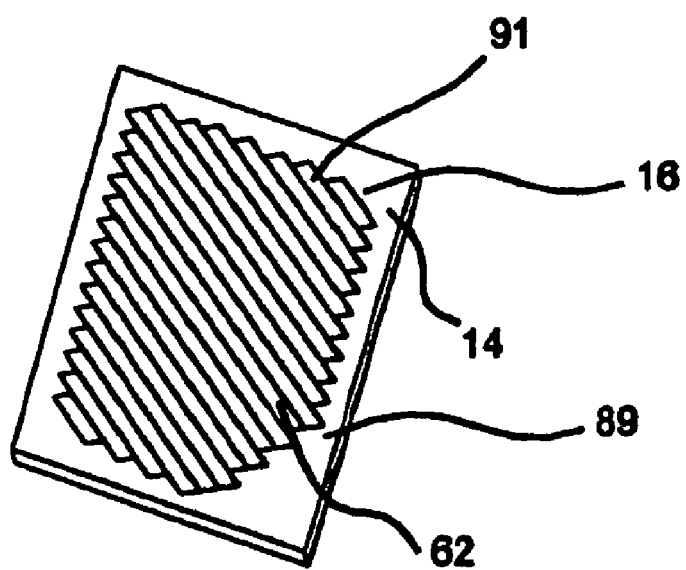
FIG. 4B is a schematic illustration showing the fabrication of an exemplary composite lay-up on a transfer sheet.

FIGS. 4A and 4B illustrate various alternatively constructed structures 14. The structure 14 shown in FIG. 4A is a lay-up mandrel 87. The lay-up mandrel 87 may be a template or mold that defines the work surface datum 16 onto which the strip material 62 is laid. Depending on the particular application, the work datum surface 16 of the lay-up mandrel 87 may have only slight to moderate contours, such that the primary compactor 96 and trailing compactor 100 (FIG. 2) can pivot at slight to moderate angles to follow the contour in a manner such that the strip material is smoothed against the work surface datum 16. Typically a maximum grade or angle the compactors 96, 100 can accommodate is about a fifteen percent incline. After the strip material 62 application is complete (all of the layers have been laid onto the work surface datum 16 to thereby form a composite material lay-up 91), the lay-up mandrel 87 is removed from the working area 26 (FIG. 1) and further processed. For example, further processing may include adding polymer resin to the composite material lay-up 91 through vacuum injection processing and/or curing or cross-linking the strip material 62 that makes up the composite material lay-up 91 through autoclaving or baking. After processing, the composite article (not shown) is removed from the lay-up mandrel 87, where it may be trimmed and/or machined as necessary.

The structure 14 shown in FIG. 4B is a transfer sheet 89, which is a layer of material that provides a surface on which to apply strip material 62. Depending on the particular application, the transfer sheet 89 may be sufficiently large such that several persons are needed to manually move (e.g., lift and carry, etc.) the transfer sheet 89 and lay-up 91 thereon. As with the lay-up mandrel 87 shown in FIG. 4A, the strip material 62 is applied in multiple layers to form a lay-up 91 on the transfer sheet 89 (FIG. 4B). After application of the strip material lay-up 91 is completed, the transfer sheet 89 can be transferred to a separate lay-up mandrel (not shown) having the desired contour for the composite article, and the strip material lay-up 91 is cured. The transfer sheet 89 may be designed to be removed from the lay-up 91, such as, for example, a removable paper backing as is known in the art. The transfer sheet 89 may alternatively be incorporated into the composite article or a part, forming, for example, an exterior or interior surface of the composite article. Incorporated transfer sheets 89 may be, for example, scrim cloth or fiberglass cloth, which may have later advantages if the composite part is machined. For example, the incorporated transfer sheet 89 may protect against splintering of the cured composite article when it is subjected to drilling or machining, and further may provide a smoother exterior finish. Subsequent processing of the lay-up 91 (with or without the transfer sheet 89) can be similar to the processing of the lay-up 91 when the mandrel 87 in FIG. 4A is used as the structure 14.

With continued reference to FIG. 1, one aspect of a exemplary embodiment of the present disclosure includes the support base 34, which can be mounted on the rotary turntable 80, wherein the orientation of the strip material 62 forming a layer 82 as applied to the work surface datum 16 can be selectively changed between layers 82 of the strip material 62. Composite reinforced materials having a single reinforced fiber direction (e.g., uniaxial tape) exhibit anisotropic characteristics, which usually mean that they typically exhibit relatively high strength along the primary axis of the reinforcement fibers, but do not exhibit the same strength along other axes. Thus, depending on the selection of strip materials and the application in which the composite reinforced material is used, it may be necessary for the composite material to exhibit isotropic or uniform strength in multiple directions for several predetermined axes. As discussed previously, when multiple material layers are laid upon the work surface datum 16 they are generally referred to as "lay-up". When the support base 34 is rotated between material layers 82, the lay-up has different orientations, such as the exemplary composite material shown in FIG. 6.

Figure 6:
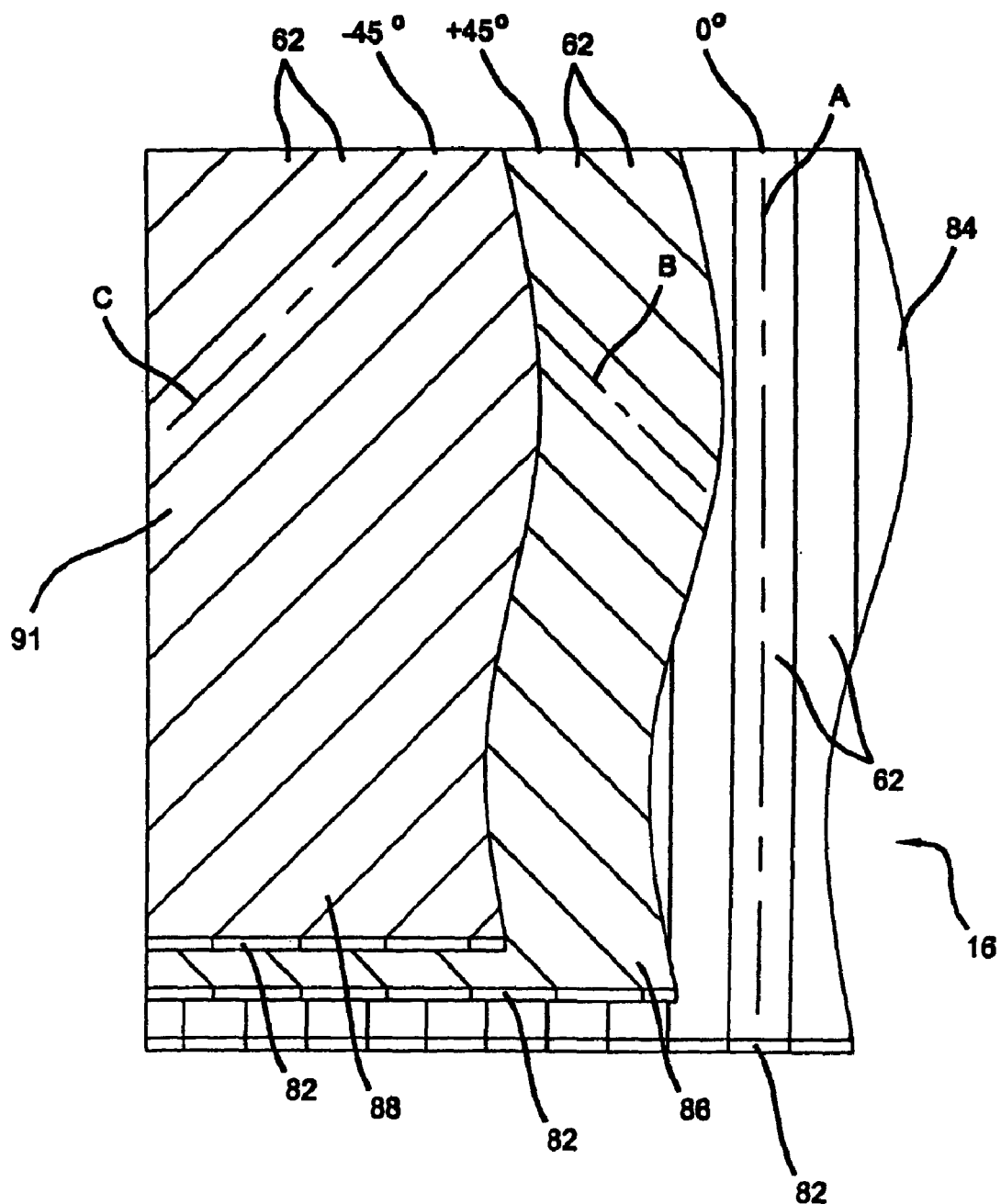
FIG. 6 is a partially broken away plan view of the composite lay-up of FIG. 1 illustrating the various layers of strip material and their orientations.

In the particular example provided in FIG. 6, a first layer 84 includes multiple material strips applied to the work surface datum 16 such that each strip 62 of this first layer 84 is laid along an axis that is parallel to a first predetermined axis A as formed by movement of the bridge rail 22 along the X axis. A second layer 86 of strip material 62 is applied over the first layer 84 such that each strip 62 of this second layer 86 is applied along an axis that is parallel to a second predetermined axis B, which is rotated at positive forty-five degrees from axis A. To accommodate this change, the support base 34 is rotated counter-clockwise forty-five degrees from the zero degree position. A third layer 88 of strip material 62 is applied over the second layer 86, such that each strip 62 of this third layer 88 is applied along an axis that is parallel to a third predetermined axis C, which is rotated negative forty-five degrees from axis A. To accommodate this change, the support base 34 is rotated clockwise forty-five degrees from the zero degree position (i.e., ninety degrees clockwise from the positive forty-five degree position). The location of the zero degree position relative to the work surface datum 16 is established by the specifications for the composite article. In one exemplary embodiment of the present disclosure, the rotary turntable 80 is automated via the conventional rotary drive mechanism 80a of a type that is well known in the art. The operation of the rotary turntable 80a can be integrated with the application of strip material 62 from the material dispensers 36. Further, as recognized by one of skill in the art, various configurations and angles may be selected for a composite material lay-up 91. As such, the example just described and shown in FIG. 6 is not intended to limit the scope of the present disclosure.

Multiple layers of the strip material applied over the work surface datum 16 (the composite material lay-up 91) can have layers 82 of strip material 62 ranging from four to over one-hundred. In one exemplary embodiment of the present disclosure, the strip material 62 has a width of about sixth inches and creates a swath of material strips having an overall width of approximately fifteen feet (where there are fifteen material dispensers on each side of the gantry 18, or thirty total material dispensers when counting both gantry sides). An exemplary range for the number of layers 82 for the lay-up 91 is between about twenty and forty layers.

Figure 7:
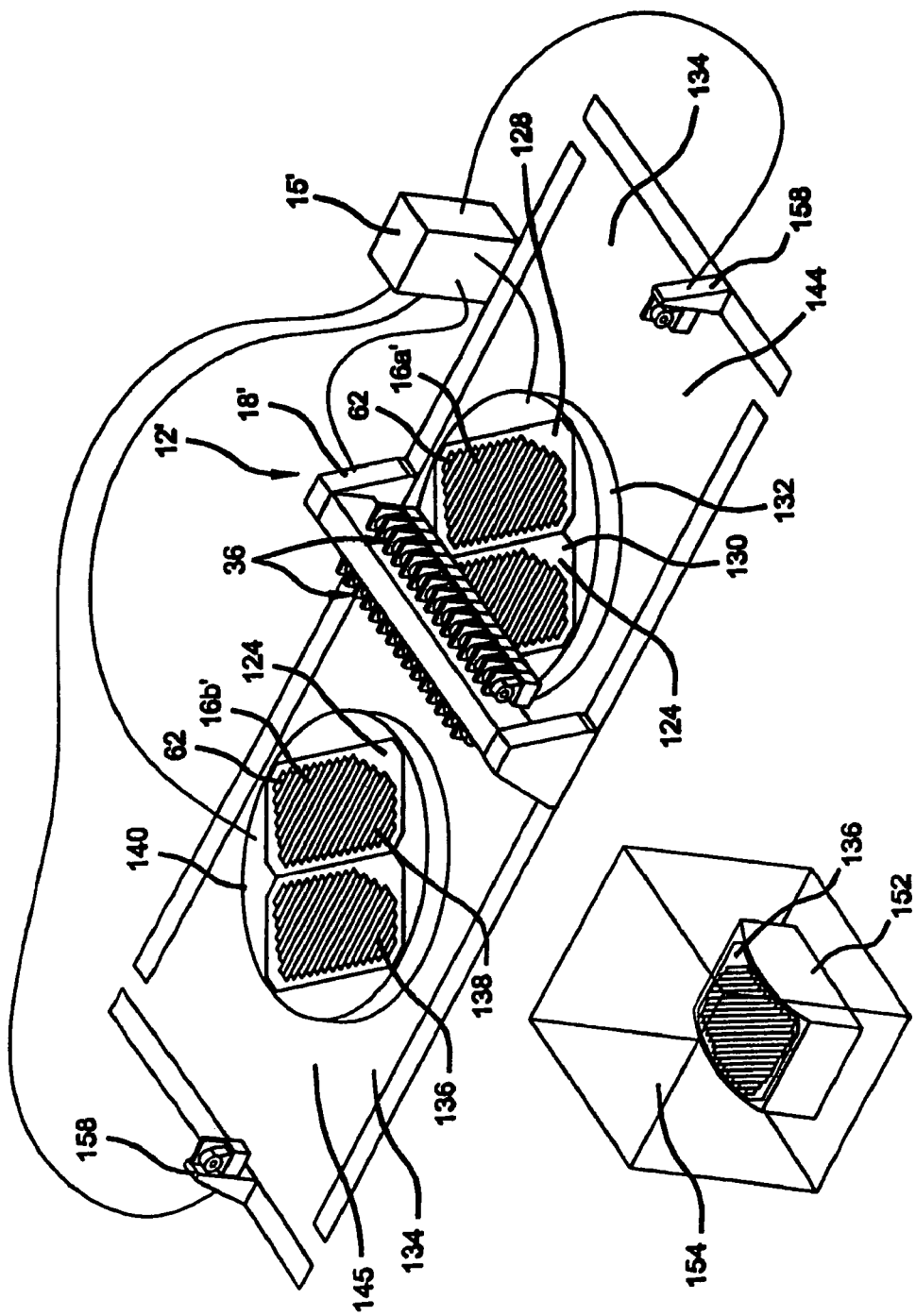
FIG. 7 is a perspective view of another exemplary embodiment of the present disclosure showing dual support bases in an active and a non-active area and a processing station.

FIG. 7 illustrates an alternately constructed composite fabrication device 12', wherein the material dispensers 36 apply strip material 62 to at least two structures 124 having work surface datums 16a' and 16b'. The several components of the composite fabrication device 12' (e.g., material changers 158, etc.) can be controlled similarly to those described in previous embodiments by a controller 15'. A first and second structure 128 and 130 rest on a first support base 132 within the work area 134 in an active area 144. A non-active area 145 within the work area 134 can be identically configured to the active area 144. The non-active area 145 has a third and fourth structure 136 and 138 resting on a second support base 140.

A gantry 18' configuration can be substantially the same structurally and operably as those described in previous embodiments. As shown in FIG. 7, the gantry 18' has a plurality of material dispensers 36 that apply strip material 62 to the work surface datums 16a', 16b'. The gantry 18' applies strip material 62 to the first and second structures 128, 130 on the first support base 132 in active area 144. The second support base 140 with the third and fourth structures 136, 138 are in the non-active area 145, where the gantry 18' is not operating. This illustrated embodiment permits two separate working areas 144, 145 for the gantry 18' and material dispensers 36. Thus, while the gantry 18' is working over the first support base 132, the second support base 140 may be accessed for other activities aside from strip material application. This configuration can be particularly advantageous where the structure 124 has lay-up applied (e.g., the transfer sheet or lay-up mandrel itself) and must be transferred to another station for further processing.

As shown in FIG. 7, two separate transfer sheets 136 and 138 are shown placed on the second support base 140. The third and fourth transfer sheets 136, 138 can be transferred and placed on a lay-up mandrel 152 (for simplicity only a single lay-up mandrel is depicted in FIG. 7). The lay-up mandrel 152 can be cured or cross-linked in a processing chamber 154. Such a processing chamber 154 is typically a heat oven or an autoclave chamber. The configuration of multiple support bases 132, 140 in this particular embodiment can permit continuous material dispenser 36 application and increases work efficiency over a single support base (132 or 140), where operations must be ceased to remove and place a new structure 124 onto the support base (e.g., 132 or 140).

FIG. 8 is a partial overhead view of a composite fabrication device 12" constructed in accordance with the teachings of another alternate embodiment of the present disclosure. As shown, the composite fabrication device 12" includes a gantry 18" having four vertical beams 20", a pair of spaced-apart bridge rails 22", a pair of lateral stabilizers 300, and a rotary dispensing unit 302 suspended from the bridge rails 22". Each bridge rail 22" is coupled to a pair of the vertical beams 20". Each lateral stabilizer 300 is coupled to a pair of vertical beams 20". The gantry 18" can be movable on the tracks 24 in a manner that is similar to that described above for the embodiment shown in FIG. 1.

With continued reference to FIG. 8, the rotary dispensing unit 302 includes an arcuate outer track 308 and a rail 310 to which the material dispensers 36 are mounted. The rail 310 may be similar to the track 65 (FIGS. 1 and 2), and the material dispensers 36 can be removably and adjustably coupled to the rail 310 through conventional quick connects 68 in a manner similar to that described above. The bridge rails 22" support the outer track 308 for rotation thereon. The rotation of the outer track 308 can be controlled via a conventional and well known rotary drive mechanism 320. The rail 310 is fixed to the outer track 308. Alternately, the outer track 308 may be non-rotatably supported by the bridge rails 22", and the rail 310 may be rotatably coupled to the outer track 308.

In the illustrated embodiment of FIG. 8, a linear drive mechanism 322 is further provided to control the movement of the rotary dispensing unit 302 along the Y axis on the bridge rails 22". The linear drive mechanism 322, rotary drive mechanism 320, and drive mechanism 25 can be coordinated by a controller 15" so that the axis 332 of the rotary dispensing unit 302 may be accurately positioned rotationally and thereafter moved in the X and Y directions to dispense strip material 62 into the work surface datum 16 along a desired axis.

In the particular embodiment illustrated, a first layer 330 was applied with the rotary dispensing unit 302 in a zero degree orientation. Then, the rotary dispensing unit 302 was rotated clockwise to a negative forty-five degree angle with respect to the zero degree axis reference, and the gantry 18" traveled along the X and Y directions to apply a second layer. As appreciated by one of skill in the art, the gantry 18" may travel only partially along the tracks 24 to apply strip material 62 at an angle, rather than full strokes from one end to the other. Due to the highly synchronized movements in some embodiments of the present disclosure, such embodiments may be fully automated with computerized control systems. Other aspects of this embodiment shown in FIG. 8 can be similar to aspects described herein for other embodiments, such as automatic material replacement by material changers (e.g., material dispenser changers 40 shown in FIG. 1, etc.).

Figure 9A:
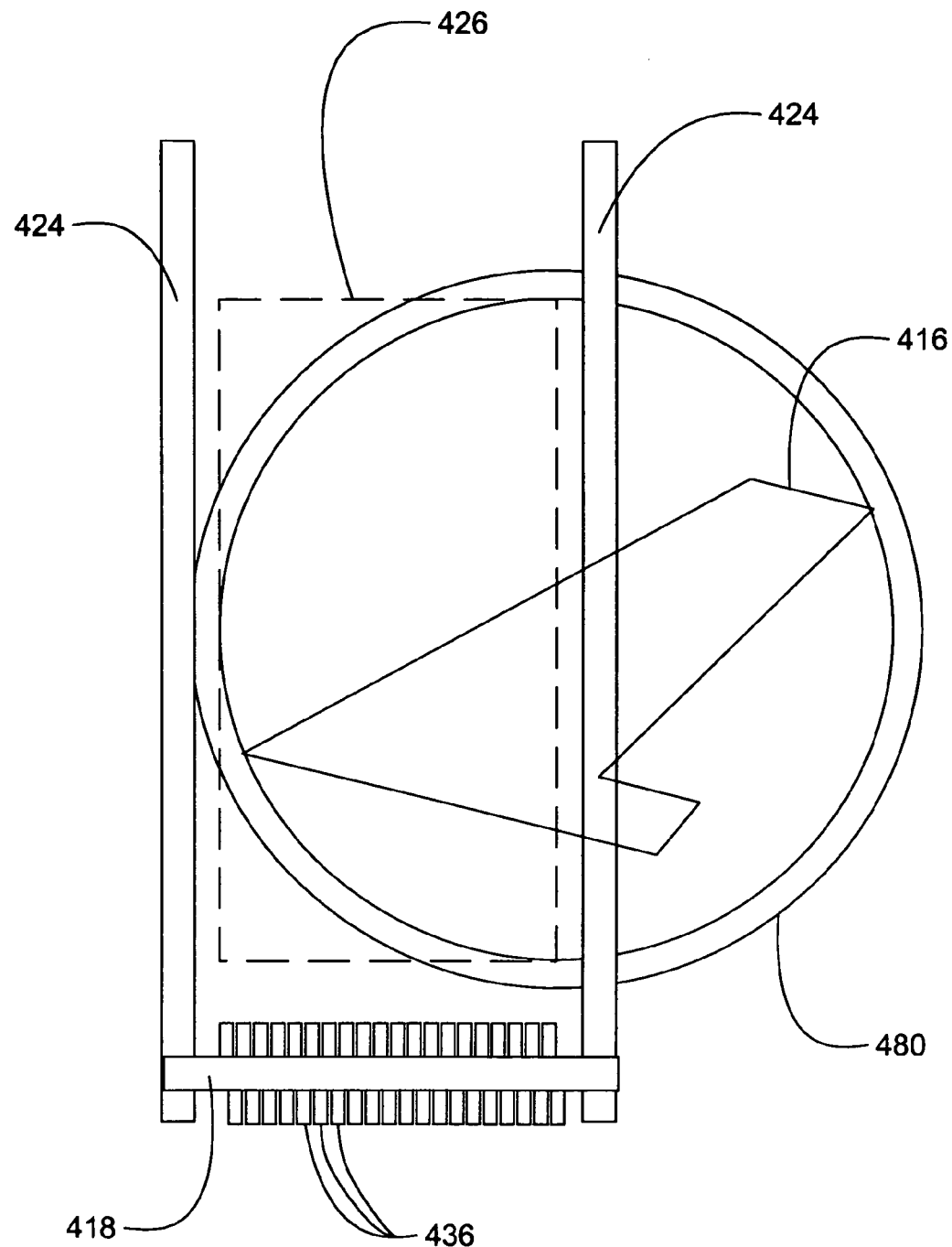
FIG. 9A is an overhead view of another exemplary gantry, turntable, and material dispenser configuration according to an exemplary embodiment of the present disclosure.
Figure 9B:
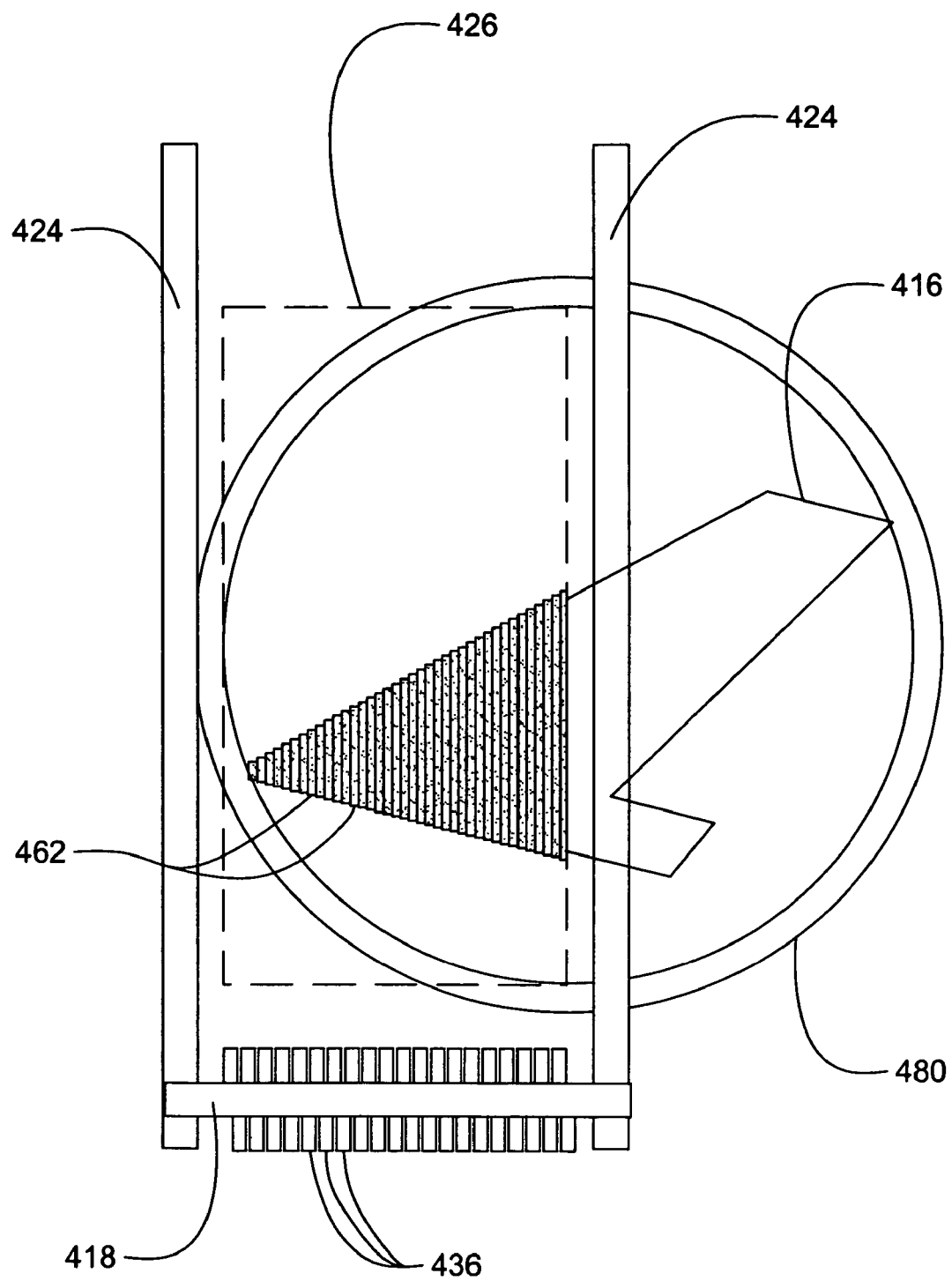
FIG. 9B is an overhead view of the embodiment shown in FIG. 9A after strip material has been laid down by the material dispensers to form a first portion of the composite lay-up on the turntable.
Figure 9C:
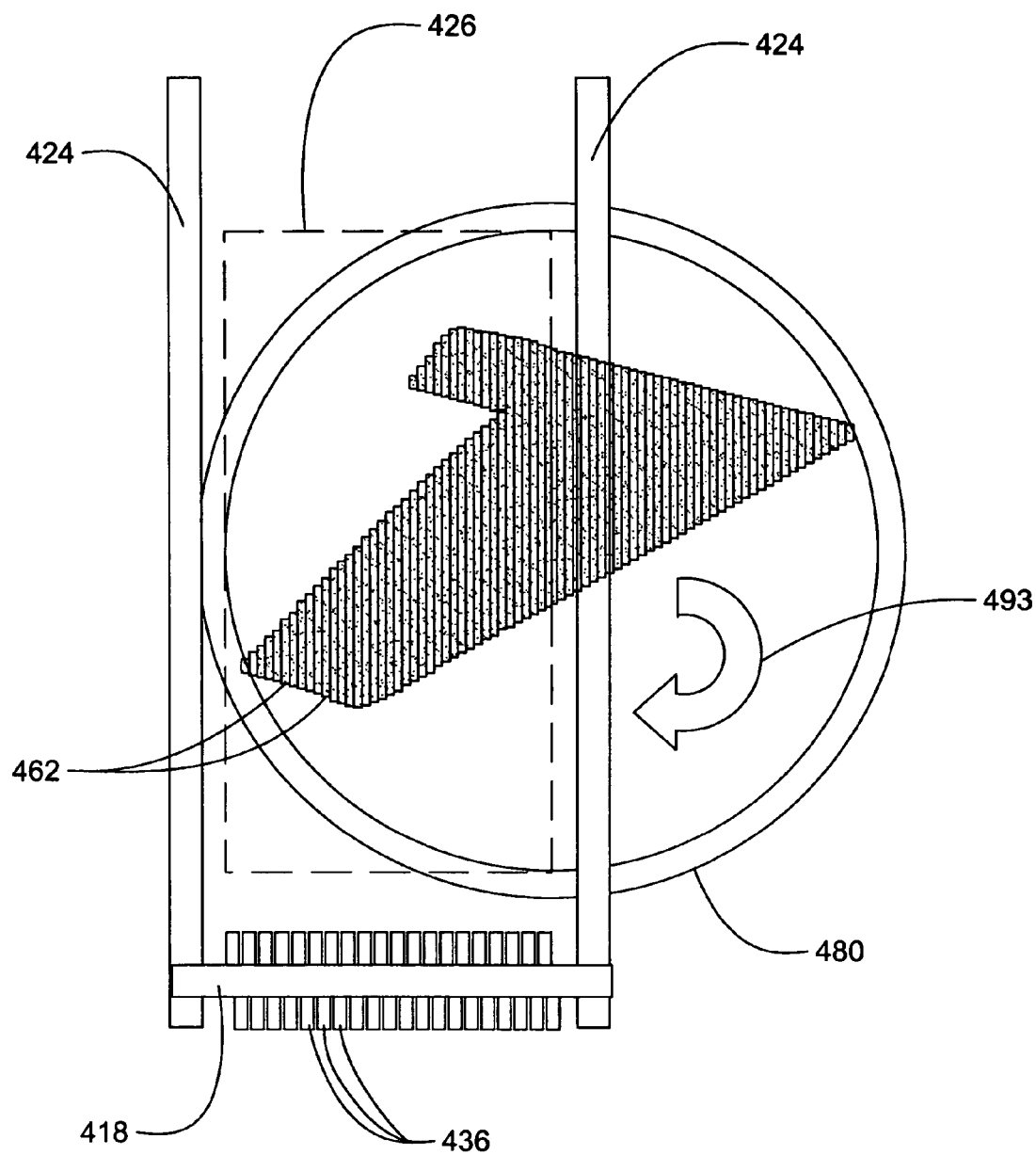
FIG. 9C is an overhead view of the embodiment shown in FIG. 9B after the turntable has been rotated one hundred eighty degrees and after strip material has been laid down by the material dispensers to form the second portion of the composite lay-up.

FIGS. 9A through 9C are overhead views showing another exemplary embodiment that includes a gantry 418 supporting an array of material dispensing heads 436 generally above a rotary turntable 480. As shown, the gantry 418 is configured for translatable movement along the tracks 424. The tracks 424 bound the opposite sides of the working area 426.

During operation, the gantry 418 can translate along the tracks 424 and move across the entire working area 426 in a first direction (i.e., an out stroke) and return in a second direction (i.e., a return stroke). During this translation of the gantry, one or more of the material dispensing heads 436 can apply strip material along a predetermined axis. Although the gantry 418 may move over the entire working area 426, the gantry 418 may alternatively only move over small regions of the working area 426. Thus, during operation when strip material 462 is being applied, the gantry 418 may be capable of traveling a shortened distance along the tracks 424. This can be advantageous, such as, for example, in FIG. 9B where the work surface datum 416 is relatively small in comparison to the overall work area 426, and the gantry 418 may only need to move partially along the tracks 424 from a starting position for the composite lay-up to an ending position for the composite lay-up. Partial translation of the gantry 418 along the tracks 424 can facilitate faster application of strip material 462 along a pre-determined axis to the work surface datum 416.

In addition, not all of the material dispensing heads 436 need to be applying strip material 462 as the gantry 418 moves along the tracks 424. Instead, the material dispensing heads 436 can be selectively operated at different times for applying strip material 462 in a particular manner. For example, as shown in FIG. 9B, the material dispensing head 436 on the left-hand side of the gantry 418 is inactive and not used for forming the composite lay-up. Also shown in FIG. 9B, the material dispensing heads 436 on the right-hand side are operated for applying strip material 462 to the work surface datum 416 for a longer period or greater portion of the gantry's travels along the tracks 424 than are the material dispensing heads 436 on the left-hand side of the gantry 418.

As shown in FIG. 9C, the turntable 480 is rotatable as represented by arrow 493. In this particular embodiment, the turntable 480 has been rotated one-hundred eighty degrees, which, in turn, allows the material dispensing heads 436 to apply strip material 462 for forming the other side portion of the composite lay-up. Or, for example, the turntable 480 may be rotated to change the orientation of the work surface datum 416, which, turn, allows the material dispensing heads 436 to apply strip material 462 along a different axis.

The illustrated embodiment of FIG. 9 can be useful for producing relatively large parts (e.g., empennage skin panels, etc.) where an impractically wide gantry and large number of heads would otherwise be needed to span the entire part. Accordingly, the illustrated embodiment shown in FIG. 9 has a gantry 418 narrower than the turntable 480 and the part being formed. Alternatively, other embodiments may include a gantry supporting less material dispensing heads than that shown in FIG. 9, where the heads are configured to shuttle sideways along the gantry to accommodate a large lay-up area with a limited number of heads.

Other aspects of the embodiment illustrated in FIG. 9 can be similar to aspects described herein for other embodiments, such as automatic material replacement by material changers (e.g., material dispenser changers 40 shown in FIG. 1, etc.) and cutters and compactors (e.g., cutter 102 and compactors 96, 100 shown in FIG. 2, kiss cutting device 902 shown in FIG. 15, etc.).

Figure 10:
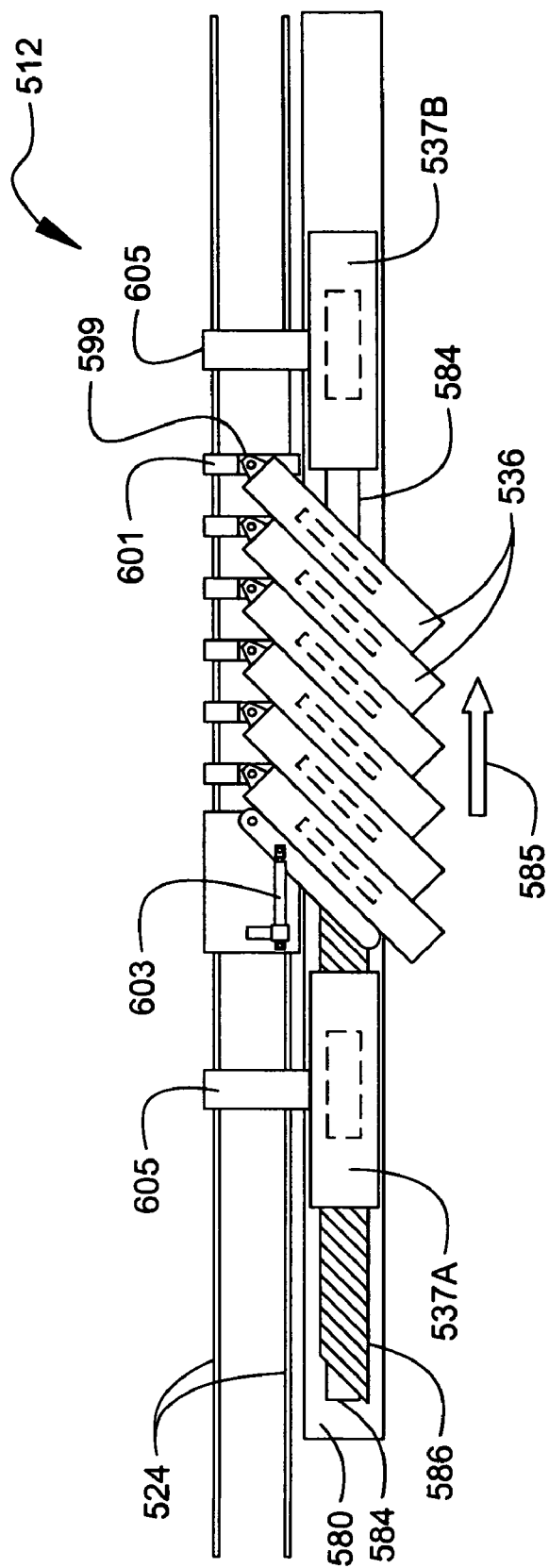
FIG. 10 is an overhead view of an exemplary embodiment of a composite fabrication device having left and right zero degree material dispensing heads and an array of six material dispensing heads deployed along a length of a lay-up table and capable of collectively swiveling.
Figure 11:
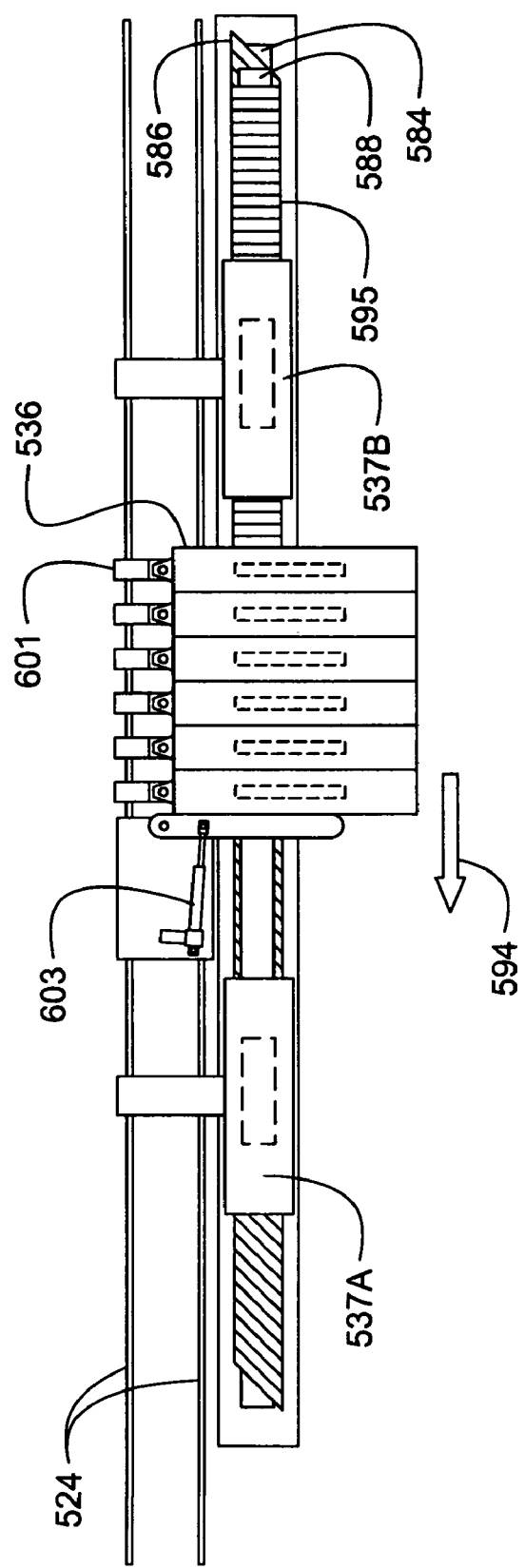
FIG. 11 is an overhead view of the composite fabrication device shown in FIG. 10 with the array of six material dispensing heads positioned at a ninety degree echelon.
Figure 12:
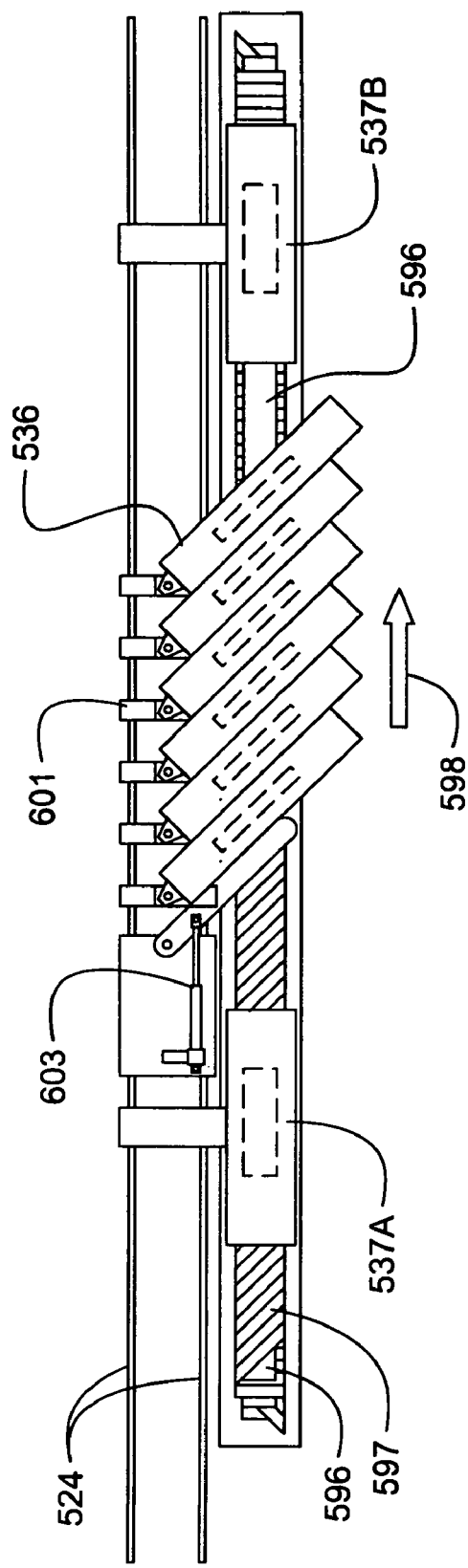
FIG. 12 is an overhead view of the composite fabrication device shown in FIG. 10 with the array of six material dispensing heads positioned at a negative forty-five degree echelon.

FIGS. 10 through 12 illustrate an exemplary embodiment of a material lamination device 512 that is well-suited for producing wing stringers, floor beams, narrow spars, and other high aspect ratio parts. As shown for this particular embodiment, an array or stack of material dispensing heads 536 is deployed along a length (X-axis) of a lay-up table 580. The stack of heads 536 are configured such that they can collectively swivel as a group, for example, to a positive forty-five degree echelon (e.g., FIG. 10), a ninety degree echelon (e.g., FIG. 11), a negative forty five degree echelon (e.g., FIG. 12), among other angular settings.

As shown in FIG. 10, the material dispensing heads 536 are pivotably supported from carriages 601 with swivels or pivots 599. The carriages 601 are configured for translatable movement along the tracks or rails 524. An actuator 603 is provided for causing the material dispensing heads 536 to collectively swivel or pivot as a group.

In this particular embodiment, the swivels or pivots 599 are generally disposed at the end portions of the material dispensing heads 536. Alternatively, other suitable locations are possible for the swivels and pivots, such as at a generally central location as shown in FIGS. 16A and 16B.

With continued reference to FIGS. 10 through 12, non-swiveling material dispensing heads 537A and 537B are respectively disposed to the left and to the right of the array of material dispensing heads 536. In this particular embodiment, the material dispensing heads 537 are not provided with swiveling capability. During operation, the non-swiveling heads 537 can be used for dispensing zero degree strip material or plies to the lay-up table 580.

As shown in FIG. 10, the material dispensing heads 537 are supported from carriages 605. The carriages 605 are configured for translatable movement along the tracks 524.

In this particular embodiment, the width of the swiveling material dispensing heads 536 are an integer multiple of the width of the tape or other strip material being dispensed by the heads 536. Furthermore, this particular example includes a stationary lay-up table 580. Alternatively, other embodiments can include a table that moves relative to the material dispensing heads.

An exemplary operation of the device 512 will now be provided for purposes of illustration only. In this particular example, a zero degree ply or layer 584 (FIG. 1) is placed by material dispensing head 537B as the material dispenser 537B moves to the right as represented by arrow 585. The material dispensing heads 536 move and follow behind the material dispensing head 537B in the direction represented by arrow 585. The material dispensing heads 536 operate in parallel and in unison to place strip material or tape segments 586 at a positive forty-five degrees onto the first ply 584. The carriages 601 advance along the X-axis a distance equal to one tape width, and the material dispensing heads 536 place another set of tape segments onto the first ply 584. This sequence continues until the gaps between the segments of that zone are filled in. The carriages 601 (and material dispensing heads 536 carried thereby) advance along the rails 524 to the next zone whereat the material dispensing heads 536 then dispense strip material within that zone. This process for the material dispensing heads 536 is repeated until the full ply 586 has been applied to the first layer 584 (as shown in FIG. 11).

Now that the ply 586 has been fully applied, the actuator 603 is actuated to cause the material dispensing heads 536 to collectively swivel or pivot from the positive forty-five degree echelon (FIG. 10) to a ninety degree echelon (FIG. 11). This swiveling or pivoting of the material dispensing heads 536 reduces the width of the tape relative to the X axis such that the material dispensing heads 536 are now closer together relative to the X axis.

As shown in FIG. 11, a third layer or ply 588 is placed by zero degree head 537A as the material dispenser 537A moves to the left as represented by arrow 594. The material dispensing heads 536 also move to the left following behind the material dispensing head 537A in the direction represented by arrow 594. The material dispensing heads 536 operate in parallel and in unison to place strip material or tape segments 595 onto the third ply 588. These tape segments 595 placed by the material dispensing heads 536 are perpendicular at a ninety degree angle relative to the zero degree third layer 588 applied by the material dispensing head 537A. The carriages 601 advance along the X-axis a distance equal to one tape width, and the material dispensing heads 536 place another set of tape segments onto the third ply 588. This sequence continues until the gaps between the segments of that zone are filled in. The carriages 601 (and material dispensing heads 536 carried thereby) advance along the rails 524 to the next zone whereat the material dispensing heads 536 then dispense strip material within that zone. This process for the material dispensing heads 536 is repeated until the full ply 595 has been applied onto the third layer 588 (as shown in FIG. 12).

The actuator 603 is actuated to cause the material dispensing heads 536 to collectively swivel or pivot from the ninety degree echelon (FIG. 11) to a negative forty-five degree echelon (FIG. 12). This swiveling or pivoting of the material dispensing heads 536 increases the width of the tape relative to the X axis and the pitch between the material dispensing heads 536.

Plies five and six 596 and 597, respectively, are placed as the heads 536 and 537 move to the left as represented by arrow 598. More specifically, the zero degree ply 596 is placed by the material dispensing head 537B. The material dispensing heads 536 (operating in parallel and unison) apply strip material or tape segments 597 at a positive forty-five degrees onto the zero degree ply 596. As before, the carriages 601 advance along the X-axis a distance equal to one tape width, and the material dispensing heads 536 place another set of tape segments onto the ply 596. Again, this sequence continues until the gaps between the segments of that zone are filled in. The carriages 603 (and material dispensing heads 536 carried thereby) advance along the rails 524 to the next zone whereat the material dispensing heads 536 then dispense strip material within that zone. This process for the material dispensing heads 536 can be repeated until the full ply 597 has been applied onto the zero degree layer 596.

The above description of an exemplary operation of the device 512 is for purposes of illustration only and is not intended to limit the scope of the present disclosure in any way. The particular operations, processes, and order thereof for the device 512 can depend, for example, on the specifications for the particular product or article being created by the device 512.

Other aspects of the embodiment illustrated in FIGS. 10 through 12 can be similar to aspects described herein for other embodiments, such as automatic material replacement by material changers (e.g., material dispenser changers 40 shown in FIG. 1, etc.) and cutters and compactors (e.g., cutter 102 and compactors 96, 100 shown in FIG. 2, etc.). For example, in some embodiments, the material dispensers 536 and/or 537 can be coupled to the respective carriages 601 and 605 by quick release connections or couplings (e.g., coupling 68 shown in FIG. 2, etc.). In such embodiments, when a dispensing head is out of tape or otherwise unserviceable, it can be replaced with a fresh head relatively quickly. Accordingly, this quick change ability can enable relatively high productivity by reducing machine downtime for tape loading and maintenance and by allowing tape loading, cleaning, repair and testing to be done offline.

Figure 13:
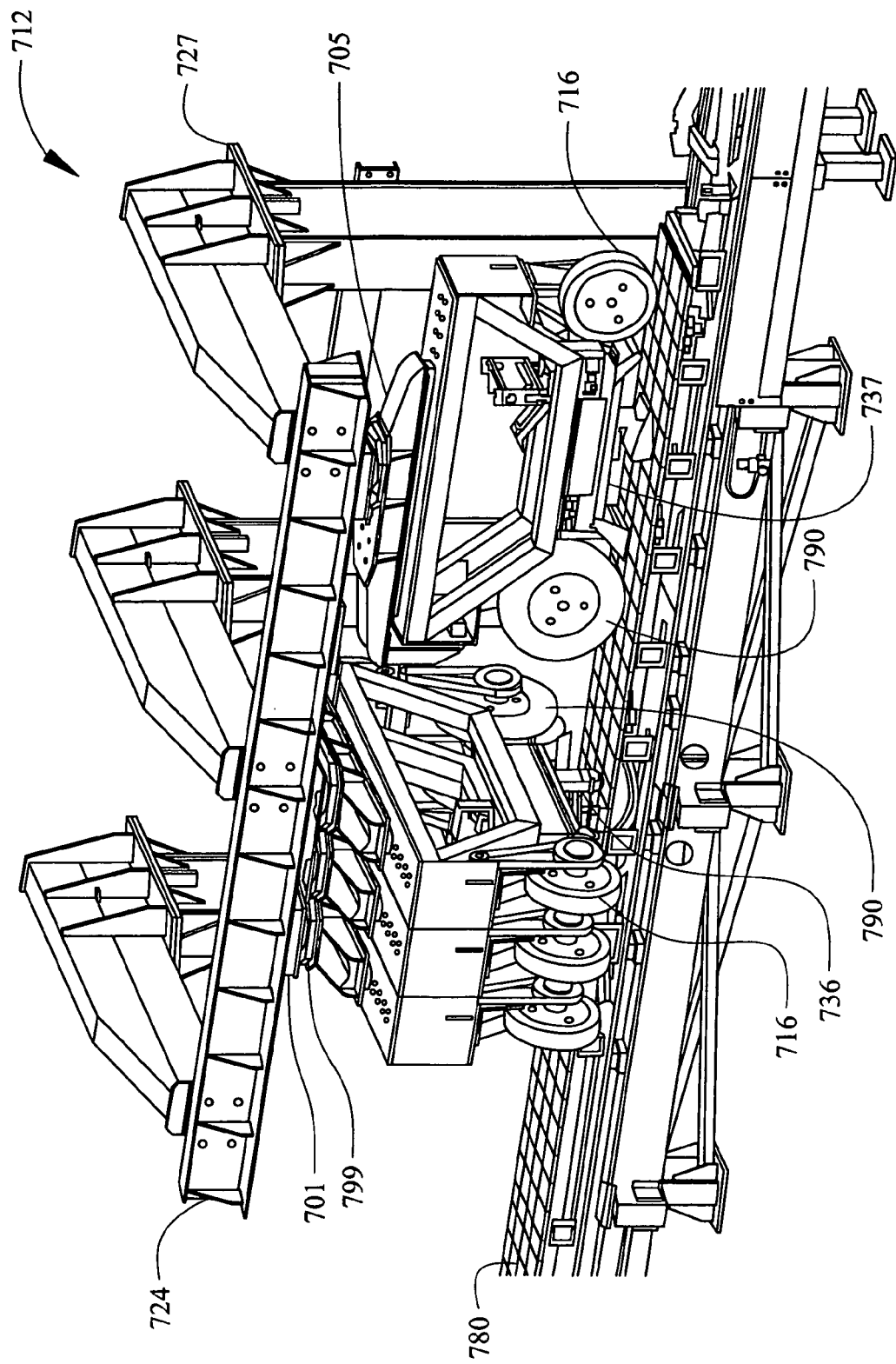
FIG. 13 is a partial perspective view of an exemplary embodiment of the material composite fabrication device including an array of swiveling material dispensing heads and a zero degree non-swiveling material dispensing head according to an exemplary embodiment of the present disclosure.

FIG. 13 illustrates an exemplary embodiment of a material composite fabrication device 712 including an array of material dispensing heads 736 and a zero degree non-swiveling material dispensing head 737. As shown in FIG. 13, the material dispensing heads 736 are pivotably supported above the lay-up table 780 by carriages 701 and swivels 799. The carriages 701 are configured for translatable movement along the track or rail 724, which, in turn, is supported by the supporting structure 727. The zero degree non-swiveling material dispensing head 737 is supported above the lay-up table 780 by carriage 705. The carriage 705 is configured for translatable movement along the track or rail 724.

With continued reference to FIG. 13, each material dispenser 736 and 737 includes strip material rolled onto a spool 790. Each material dispenser 736 and 737 also includes a collector spool 716 onto which backing paper from the strip material may be wound and stored.

Other aspects of the embodiment illustrated in FIG. 13 can be similar to aspects described herein for other embodiments, such as automatic material replacement by material changers (e.g., material dispenser changers 40 shown in FIG. 1, etc.) and cutters and compactors (e.g., cutter 102 and compactors 96, 100 shown in FIG. 2, etc.).

Figure 14:
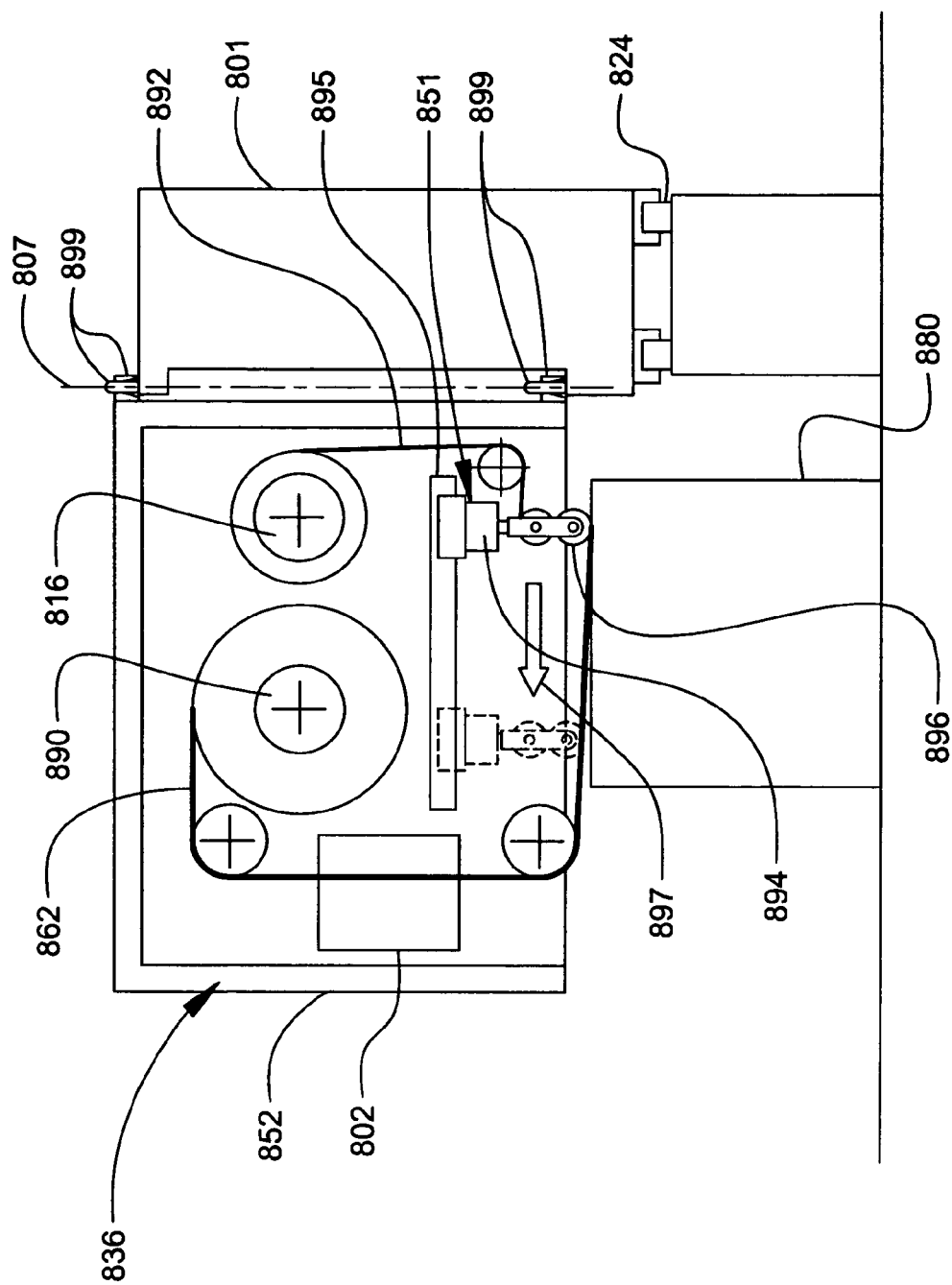
FIG. 14 is a cross-sectional view showing components of an exemplary material dispensing head according to an exemplary embodiment of the present disclosure.

FIG. 14 illustrates an exemplary configuration for a material dispenser or head 836 according to one embodiment of the present disclosure. This illustrated configuration may be implemented for any one or more of the material dispensing heads (e.g., 36, 436, 536, 537, 736, 737, etc.) shown and described herein).

As shown in FIG. 14, the material dispenser 836 is coupled to the carriage 801 with swivels or pivots 899. The carriage 801 is configured for translatable movement along the tracks or rails 824. Bearings and/or lubrication may also be provided to facilitate sliding movement of the carriage 801 along the rails 824. In addition, an actuator can be provided for causing pivoting or swiveling of the material dispensing head 836 about axis 807 relative to the lay-up table 880.

With continued reference to FIG. 14, the material dispenser 836 operably houses strip material 862 (e.g., carbon tape with backing paper, etc.) that is rolled onto a spool 890 in the material dispenser's housing 852. The strip material 862 has a backing paper 892, which may, for example, inhibit undesirable blocking of the strip material 862 as the strip material 862 travels across the various rollers within housing 852 during operation of the material dispenser 836.

The strip material 862 can be cut by cutting unit 802 prior to approaching a release region where the strip material 862 is applied to the work surface datum. The cutter 802 is configured such that the strip material 862 is cut while leaving the backing paper 892 intact. Accordingly, the backing paper 892 alone exits from the sweep down roller 896 through the serpentine or generally S-shaped path defined by the sweep down roller 896. The backing paper 892 is then wound onto a collector spool 816. The backing paper 892 can help draw the strip material 862 into the release region of the material dispenser 836. The backing paper 892 can help facilitate movement and smooth application of the strip material 862 along the work surface datum.

In the particular illustrated embodiment, the material dispenser 836 includes a cutter 802 for cutting the strip material 862. A wide range of cutting devices and systems can be used for the cutting unit 802 of the material dispenser 836, including the cutter 102 shown in FIGS. 2 and 5, the kissing cutting device 902 shown in FIG. 15, among other suitable cutters (e.g., lasers, ultrasonic blades, helical blades, etc.).

The material dispenser 836 also includes a subcarriage 851 that is reciprocally translatable along a horizontal track 895. As described herein, the subcarriage 851 allows the material dispenser 836 to dispense strip material having a predetermined length by movement (as represented by arrow 897) of the-subcarriage 851 without requiring movement of the material dispenser 836 as a whole.

In the particular embodiment shown in FIG. 14, the subcarriage 851 includes a sweep down roller 896. The sweep down roller 896 is retractable relative to the table 880 (as shown by the broken line representation of the roller 896). The roller 896 can be retracted when the material dispenser 836 is not in use. An actuator 894 is provided for applying a generally downward force to the roller 896 for causing downward movement of the roller 896 from its retracted position to an extended position. In the extended position, the roller 896 can operate or roll against the strip material 862 and backing paper 892 being applied by the material dispenser 836 for compressing or smoothing the strip material 862 against the work surface datum. The operation of the subcarriage 851, actuator 894 and/or movement of the roller 896 can be automated by computerized controls.

Accordingly, various embodiments of the present disclosure include the tape segment being already in position for placement before the actual lay down process starts. In such embodiments when the lay down starts, only the sweep down roller has to move as opposed to moving the entire material dispensing head and its supply and take-up spools as is commonly required for at least some existing CTLM machines. Alternative embodiments can include different devices, however, for compacting and smoothing the strip material, such as the compactors and shoes 96 and 100 shown in FIG. 2.

FIG. 15 illustrates an exemplary kiss cutting device 902 capable of cutting strip material at different angles according to an exemplary embodiment of the present disclosure. This illustrated cutting device 902 may be implemented with any one or more of the material dispensing heads (e.g., 36, 436, 536, 537, 736, 737, 836, etc.) shown and described herein.

With continued reference to FIG. 15, the kiss cutting unit 902 is configured for making cuts through the strip material 962 (e.g., carbon tape, etc.) without cutting the backing paper. Unlike some existing CTLM machines, the kiss cutting unit 902 can make angular cuts on the fly, such as cutting prepreg tape at a positive or a negative forty-five degree angle while the prepreg tape is in motion.

The kiss cutting unit 902 includes a blade 906. The blade 906 can be rotated relative to the support 907 (and the strip material 962) such that the blade 906 is in the angular position shown in FIGS. 15A and 15C, or in the angular position shown in FIG. 15B. These two different angular positions for the blade 906 are about ninety degrees apart for this particular embodiment, although other configurations are also possible.

The blade 906 is also translatable along at least a portion of the length of the support 907 as shown by a comparison of the blade positions shown in FIGS. 15B and 15C. The support 907 can also be rotated relative to the strip material 962 such that the support 907 can be positioned as shown in FIGS. 15B and 15C, or in the position shown in FIG. 15A. These two different positions for the support 907 are about ninety degrees apart for this particular embodiment, although other configurations are also possible.

In the particular illustrated embodiment of FIG. 15, the kiss cutting unit 902 can provide different angular cuts or cut selections by selectively rotating one or both the blade 906 and the support 907 to thereby change the angle of the blade relative to the strip material 962. By coordinating the movements of the blade 906, support 907, and strip material 962, the blade 906 can make about a ninety degree cut (represented by broken line 903 in FIG. 15A), about a positive forty-five degree cut (represented by broken line 904 in FIG. 15B), and about a negative forty-five degree cut (represented by broken line 905 in FIG. 15C).

An exemplary operation of the kiss cutting device 902 (FIG. 15) with the material dispenser 836 (FIG. 14) will now be provided for purposes of illustration only. Within the dispensing head 836, carbon tape 862 with backing paper 892 travels from the supply spool 890 through the cutting device 802 (which in this particular example comprises the kiss cutting device 902) to the sweep down roller 896. The backing paper 892 alone exits the sweep down roller 896 through the serpentine path and onto the backing paper take-up spool 816.

This movement of the tape 862 and backing paper 892 through the material dispenser 836 (and kiss cutting unit 902) can occur under computer control. At the appropriate location, the blade 906 of the kiss cutting unit 906 cuts through the tape 862 but not the backing paper 892. The tape segment (with the backing paper still attached) moves into position just above the lay-up table 880. When the head is in position, the sweep down roller 896 presses down to the work surface and travels from right-to-left (as represented by arrow 894). After the tape segment is pressed down to the table 880, the sweep down roller 894 retracts or lifts up (as shown by the broken line representation of the roller 894). The sweep down roller 894 then moves to the right and returns to the starting position, while pulling the backing paper 892 along with the roller 894.

This particular exemplary method of laying relatively short tape segments is different and faster than at least some existing CTLM machines. First, the tape cuts can be made on the fly with the kiss cutting device 902. Second, the tape segment is already in position for placement before the lay down starts. Accordingly, when the lay down starts, only the sweep down roller has to accelerate and move, as opposed to accelerating the entire head and accelerating the supply and take-up spools as is done with at least some existing CTLM machines.

The above description of an exemplary operation of the kiss cutting device 902 with the material dispenser 836 is for purposes of illustration only and is not intended to limit the scope of the present disclosure in any way. Alternatively, the kiss cutting device 902 can be used with other material dispensers besides material dispenser 836, and the material dispenser 836 can include other cutting devices besides the kiss cutting device 902.

FIGS. 16A and 16B illustrate another embodiment of a composite fabrication device 1012 including an array or stack of material dispensing heads 1036. As shown, the material dispensing heads 1036 are generally positioned in a rank and are carried on a rail 1022, which, in turn, is carried by the gantry 1018. The gantry 1018 is configured for translatable movement along (X-axis) the tracks or rails 1024. The rail 1022 is configured for translatable movement along (Y-axis) a track 1026 defined by the gantry 1018.

In addition, the rail 1022 is rotatably coupled to the gantry 1018 with a generally centrally located pivot or swivel 1099. Accordingly, the rail 1022 can be rotated relative to the gantry 1018 (and thus the work surface datum 1016). When the rail 1022 is rotated relative to the gantry 1018, the material dispensing heads 1036 collectively rotate as a group relative to the work surface datum 1016, as shown by FIGS. 16A and 16B.

In this particular embodiment, the movement of the gantry 1018 along the rails 1024 and/or the movement of the rail 1022 (e.g., rotation and/or translation) relative to the gantry 1018 can be controlled to change the orientation with which material is laid onto the work surface datum 1016 by the material dispensing heads 1036. For example, FIG. 16A shows the material dispensing heads 1036 at about a positive forty-five degree echelon, and FIG. 16B shows the material dispensing heads 1036 at about a zero degree echelon. The material dispensing heads 1036 may also be positioned at other angular orientations (e.g., a negative forty-five degree echelon, ninety positive or negative ninety degree echelon, etc.) depending, for example, on the particular specifications for the composite article.

Other aspects of the embodiment illustrated in FIGS. 16A and 16B can be similar to aspects described herein for other embodiments, such as automatic material replacement by material changers (e.g., material dispenser changers 40 shown in FIG. 1, etc.) and cutters and compactors (e.g., cutter 102 and compactors 96, 100 shown in FIG. 2, kiss cutting device 902 shown in FIG. 15, etc.).

In any of the various embodiments of the present disclosure, the general machine configuration may be varied depending on particular needs. For example, variations can include increasing or decreasing the number of material dispensing heads for a particular embodiment, using a moving table instead of moving heads (and vice versa) for a particular embodiment, varying the width of strip material, using a wheel knife versus an ultrasonic knife, and/or using an end pivot versus a center pivot for a material dispensing head.

Aspects of the present disclosure also relate to methods for forming composite materials according to the teachings of various embodiments of the present disclosure. In one embodiment, a method for fabricating a composite article generally includes using a plurality of material dispensers (e.g., 36, 436, 536, 537, 736, 737, 836, etc.), where each material dispenser dispenses a strip material (e.g., 62, etc.) to a work surface datum (e.g., 16, etc.) on a structure (e.g., 14, etc.) beneath the material dispensers. The strip material can be applied to the work surface datum, such that each material dispenser applies strip material along a predetermined axis onto the work surface datum to form a first layer (e.g., 84, etc.) having a first orientation. The work surface datum can be movable relative to the plurality of material dispensers, and/or the material dispensers can be movable relative to the work surface datum. Either the work surface datum or the material dispensers can be rotated, and then strip material can be applied over the first layer along a predetermined axis to form a second layer (e.g., 86, etc.) having a second orientation. Such a process may be repeated to apply multiple layers (e.g., 82, etc.). The strip material can be cut by a cutting device (e.g., 102, etc.) prior to the relative rotation operation. Treatment, curing, and/or reacting may follow the application of the layers of strip material to the work surface datum. Further, the material dispensers can be automatically changed with material dispenser changers (e.g., 40).

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order or performance. It is also to be understood that additional or alternative steps may be employed.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A device for fabricating a high aspect ratio composite article, the device comprising:
  a generally straight line of material dispensers movable relative to a structure having a work surface datum, each material dispenser operable for applying strip material to the work surface datum along a predetermined axis;
  the line including at least a first material dispenser, at least a second material dispenser in-line with the first material dispenser, and a plurality of rotatable parallel material dispensers each oriented substantially parallel with each of the other rotatable parallel dispensers at an angle non-parallel to the line, the parallel material dispensers disposed generally between and non-parallel to the first and second in-line material dispensers;
  the dispensers translatable together in file to apply strip material, the in-line dispensers individually operable to apply strip material to the work surface datum along the same predetermined axis, in one direction and then the opposite direction; and
  the parallel material dispensers each rotatable about a vertical axis corresponding to the dispenser, the parallel material dispensers translatable relative to the line to apply strip material along predetermined parallel axes that are not parallel to strips applied by the first and second in-line material dispensers.

2. The device of claim 1, wherein at least one of the parallel material dispensers further comprises a track therein and a subcarriage translatable along the track and operable for dispensing a predetermined length of strip material by movement of the subcarriage without requiring movement of the material dispenser as a whole.

3. The device of claim 2, wherein the rotatable parallel material dispensers are positioned relative to the in-line dispensers to allow application of strip material to the work surface datum by the rotatable parallel material dispensers when one of the in-line dispensers is applying strip material to the work surface datum.

4. The device of claim 1, wherein at least one of the material dispensers includes a kiss cutting device operable for selectively cutting strip material, without cutting backing material, at a selected one of a plurality of different angles as strip material is moving relative to the cutting device.

5. The device of claim 1, wherein at least one of the material dispensers includes:
  at least one support selectively rotatable between at least two angular positions relative to the strip material; and
  at least one blade coupled to the support such that the blade is translatable along at least a portion of the support and selectively rotatable relative to the support between at least two angular positions;
  the selective positioning of the support and the blade allowing cutting of material at a selected one of a plurality of different angles.

6. The device of claim 1, wherein the first and second in-line material dispensers have fixed angular orientations relative to the work surface datum such that the first and second in-line material dispensers can only apply strip material to the work surface datum along a single predetermined axis.

7. The device of claim 6, wherein the angular orientations of the first and second in-line material dispensers are fixed such that the first and second in-line dispensers can only apply strip material to the work surface datum along an axis parallel with the direction of translatable movement of the first and second in-line material dispensers, whereby strip material applied by the first and second in-line material dispensers form zero degree layers.

8. A device for fabricating a high aspect ratio composite article from strips of composite material, the device operable relative to a structure having a work surface datum, the device comprising:
  at least two in-line material dispensers movable relative to the structure, each dispenser supported from an in-line material dispenser carriage corresponding to the dispenser and translatable along one or more tracks to apply strip material to the work surface datum, the in-line dispensers configured to dispense material to the work surface datum along the same predetermined axis; and
  a plurality of parallel material dispensers each of which is substantially parallel with each of the other parallel material dispensers and movable relative to the structure, each parallel material dispenser supported from a parallel material dispenser carriage corresponding to the dispenser and translatable in file with the in-line dispensers along the one or more tracks to apply strip material to the work surface datum, the parallel material dispensers disposed generally between and non-parallel to the in-line dispensers and collectively pivotable relative to the predetermined axis along which the in-line material dispensers dispense material;
  the in-line material dispensers translatable relative to the work surface datum such that the in-line material dispensers can apply strip material to the work surface datum in one direction and then the opposite direction along the predetermined axis;
  the parallel material dispensers collectively pivotable and collectively translatable relative to the work surface datum such that the parallel material dispensers can be pivotally positioned for applying strip material to the work surface datum along predetermined axes that are parallel to each other but not parallel to material strips applied by the in-line material dispensers;
  each of at least the parallel material dispensers having a track therein and a sub-carriage reciprocally translatable along the track, the sub-carriage having a retractable roller configured to apply a predetermined length of strip material to the work surface datum.

9. A device for fabricating a high aspect ratio composite article, the device comprising:
one or more in-line material dispensers each configured to apply a strip material to a work surface datum along a predetermined axis; and
a plurality of parallel material dispensers collectively pivotable to collectively apply a plurality of material strips to the work surface datum non-parallel to the predetermined axis;
the dispensers configured in a generally straight line wherein a first of the one or more in-line material dispensers is configured to apply a first layer of strip material to the work surface datum along the predetermined axis while the pivotable parallel material dispensers are advanced as a unit and in file with the first in-line material dispenser, the pivotable parallel dispensers further reversibly translatable relative to the line to collectively lay a second layer of strip material over the first layer.

10. The device of claim 9, each of at least the parallel material dispensers comprising a track therein and a sub-carriage reciprocally translatable along the track to lay the second layer.

11. The device of claim 10, the sub-carriage comprising a retractable roller configured to apply a predetermined length of strip material to the work surface datum.

12. The device of claim 9, at least one of the material dispensers comprising a kiss cutting device operable to selectively cut the strip material, without cutting a backing material of the strip material, at a selected one of a plurality of different angles as the strip material moves relative to the kiss cutting device.

13. The device of claim 9, each material dispenser comprising a carriage from which the dispenser is supported, the carriage translatable along one or more tracks to apply strip material to the work surface datum.

14. The device of claim 9, wherein the pivotable parallel material dispensers are configured to be advanced as a unit along the predetermined axis for a distance equal to a width of one of the plurality of material strips between collective applications by the parallel material dispensers of material strips to the work surface datum.

15. The device of claim 9, at least one of the material dispensers comprising:
a carriage for reciprocally translating the material dispenser on one or more tracks relative to the predetermined axis; and
a sub-carriage for reciprocally translating at least a portion of the material dispenser relative to another portion of the material dispenser.

16. A device for fabricating a high aspect ratio composite article, the device comprising:
a plurality of parallel material dispensers collectively translatable in file along one or more tracks to apply, in unison to a work surface datum of a structure, a plurality of strips of composite material each at the same predetermined angle relative to the work surface datum, each dispenser having:
a cutter configured to selectively cut a predetermined length of the material, without cutting a backing of the material, at an angle corresponding to the predetermined angle;
a generally horizontal track in the dispenser and a sub-carriage reciprocally translatable on the generally horizontal track to apply the cut predetermined length of material to the work surface datum without movement of the parallel material dispenser as a whole relative to the cut predetermined length being applied; and
a pivot about which the dispenser is pivotable in unison with the other parallel material dispensers to change the predetermined angle relative to the work surface datum at which the dispensers apply strips of composite material as the dispensers are translated in file along the one or more tracks and the sub-carriages are translated in rank within the dispensers.

17. The device of claim 16, each dispenser comprising a carriage to which the dispenser is pivotally attached via the pivot, the carriage translatable along one or more tracks.

18. The device of claim 16, further comprising an actuator operatively connected with the dispensers for changing the predetermined angle relative to the work surface datum at which the dispensers apply strips of composite material.

19. The device of claim 16, further comprising one or more in-line material dispensers movable relative to the structure, each in-line dispenser supported from a corresponding carriage translatable along the one or more tracks to apply strip material to the work surface datum.

20. The device of claim 19, comprising two in-line material dispensers separated from each other by the parallel dispensers.

21. The device of claim 16, further comprising a sweep-down roller of the sub-carriage, the roller actuatable to retract with the material backing away from the work surface datum after applying the strip material to the work surface datum.

* * * * *